(12) United States Patent
Ikezoye et al.

(10) Patent No.: US 10,194,187 B2
(45) Date of Patent: *Jan. 29, 2019

(54) METHOD AND APPARATUS FOR IDENTIFYING MEDIA CONTENT PRESENTED ON A MEDIA PLAYING DEVICE

(75) Inventors: Vance E. Ikezoye, Los Gatos, CA (US); James B. Schrempp, Saratoga, CA (US)

(73) Assignee: Audible Magic Corporation, Los Gatos, CA (US)

(*) Notice: Subject to any disclaimer, the term of this patent is extended or adjusted under 35 U.S.C. 154(b) by 438 days.

This patent is subject to a terminal disclaimer.

(21) Appl. No.: 13/011,776

(22) Filed: Jan. 21, 2011

(65) Prior Publication Data

US 2011/0119149 A1 May 19, 2011

Related U.S. Application Data

(63) Continuation of application No. 12/251,404, filed on Oct. 14, 2008, now Pat. No. 7,917,645, which is a (Continued)

(51) Int. Cl.
*H04N 21/266* (2011.01)
*G06F 17/30* (2006.01)
(Continued)

(52) U.S. Cl.
CPC ... *H04N 21/26603* (2013.01); *G06F 17/3002* (2013.01); *G06F 17/30038* (2013.01);
(Continued)

(58) Field of Classification Search
USPC .............. 705/50, 51, 14.1, 14.4; 707/1, 104; 726/23, 24, 27; 713/176
See application file for complete search history.

(56) References Cited

U.S. PATENT DOCUMENTS 2,539,767 A 1/1951 Anderson
3,919,479 A 11/1975 Moon et al.
(Continued)

FOREIGN PATENT DOCUMENTS

EP 0349106 A1 1/1990
EP 0402210 A1 6/1990
(Continued)

OTHER PUBLICATIONS

Patel et al (Video classification using speaker identification) (Year: 1997).*
(Continued)

*Primary Examiner* — Mamon Obeid
(74) *Attorney, Agent, or Firm* — Lowenstein Sandler LLP

(57) ABSTRACT

A media device generates a digital fingerprint of perceptual features of a segment of a work. The segment is less than an entirety of the work and includes at least one of audio or video media content. The media device sends a query to a lookup server for data associated with the work, the query including said digital fingerprint. The media device receives the data associated with said work from said lookup server in response to said query, wherein the data was identified based on a comparison of the digital fingerprint to a collection of digital fingerprints of known works. The media device then processes the received data.

15 Claims, 5 Drawing Sheets

Related U.S. Application Data continuation of application No. 10/955,841, filed on Sep. 29, 2004, now Pat. No. 7,500,007, which is a continuation of application No. 09/511,632, filed on Feb. 17, 2000, now Pat. No. 6,834,308.

(51) Int. Cl.
| | | |
|---|---|---|
| *G06Q 20/10* | (2012.01) | |
| *G06Q 20/36* | (2012.01) | |
| *G06Q 30/06* | (2012.01) | |
| *H04N 7/173* | (2011.01) | |
| *H04N 21/235* | (2011.01) | |

(52) U.S. Cl.
CPC .. *G06F 17/30743* (2013.01); *G06F 17/30758* (2013.01); *G06F 17/30784* (2013.01); *G06F 17/30787* (2013.01); *G06Q 20/10* (2013.01); *G06Q 20/367* (2013.01); *G06Q 30/0631* (2013.01); *H04N 7/17318* (2013.01); *H04N 21/2353* (2013.01)

(56) References Cited

U.S. PATENT DOCUMENTS

| | | |
|---|---|---|
| 4,230,990 A | 10/1980 | Lert, Jr. et al. |
| 4,449,249 A | 5/1984 | Price |
| 4,450,531 A | 5/1984 | Kenyon |
| 4,454,594 A | 6/1984 | Hefron et al. |
| 4,623,837 A * | 11/1986 | Efron ............... G11B 20/1816 324/112 |
| 4,677,455 A | 6/1987 | Okajima |
| 4,677,466 A | 6/1987 | Lert, Jr. et al. |
| 4,739,398 A | 4/1988 | Thomas et al. |
| 4,843,562 A | 6/1989 | Kenyon et al. |
| 4,918,730 A | 4/1990 | Schulze |
| 5,210,820 A | 5/1993 | Kenyon |
| 5,283,819 A | 2/1994 | Glick |
| 5,327,521 A | 7/1994 | Savic et al. |
| 5,437,050 A | 7/1995 | Lamb et al. |
| 5,442,645 A | 8/1995 | Ugon |
| 5,504,518 A | 4/1996 | Ellis |
| 5,581,658 A | 12/1996 | O'Hagan et al. |
| 5,588,119 A | 12/1996 | Vincent |
| 5,612,974 A | 3/1997 | Astrachan |
| 5,613,004 A | 3/1997 | Cooperman et al. |
| 5,638,443 A | 6/1997 | Stefik |
| 5,692,213 A | 11/1997 | Goldberg et al. |
| 5,701,452 A | 12/1997 | Siefert |
| 5,710,916 A | 1/1998 | Barbara et al. |
| 5,758,257 A | 2/1998 | Herz et al. |
| 5,724,605 A | 3/1998 | Wissner |
| 5,732,193 A | 3/1998 | Aberson |
| 5,790,691 A | 8/1998 | Narayanswamy et al. |
| 5,850,388 A | 12/1998 | Anderson |
| 5,862,260 A * | 1/1999 | Rhoads ............. G06F 17/30876 382/232 |
| 5,918,223 A * | 6/1999 | Blum ................ G06F 17/30017 |
| 5,924,071 A | 7/1999 | Morgan et al. |
| 5,930,369 A | 7/1999 | Cox et al. |
| 5,930,749 A * | 7/1999 | Maes .................. G10L 21/0272 704/219 |
| 5,943,422 A | 8/1999 | Van Wie et al. |
| 5,949,885 A | 9/1999 | Leighton |
| 5,959,659 A | 9/1999 | Dokic |
| 5,983,176 A | 11/1999 | Hoffert et al. |
| 6,006,183 A | 12/1999 | Lai et al. |
| 6,006,256 A | 12/1999 | Zdepski et al. |
| 6,011,758 A | 1/2000 | Dockes |
| 6,012,051 A * | 1/2000 | Sammon, Jr. .......... G06Q 30/02 705/26.2 |
| 6,026,411 A * | 2/2000 | Delp .................. G06F 17/3025 382/162 |
| 6,026,439 A | 2/2000 | Chowdhury |
| 6,044,402 A | 3/2000 | Jacobson |
| 6,067,369 A | 5/2000 | Kamei |
| 6,067,517 A * | 5/2000 | Bahl ...................... G10L 15/20 704/242 |
| 6,088,455 A | 7/2000 | Logan et al. |
| 6,092,040 A | 7/2000 | Voran |
| 6,096,961 A | 8/2000 | Bruti |
| 6,118,450 A | 9/2000 | Proehl et al. |
| 6,192,340 B1 | 2/2001 | Abecassis |
| 6,195,693 B1 | 2/2001 | Berry |
| 6,243,615 B1 | 6/2001 | Neway |
| 6,243,725 B1 | 6/2001 | Hempleman et al. |
| 6,253,193 B1 | 6/2001 | Ginter |
| 6,253,337 B1 | 6/2001 | Maloney et al. |
| 6,279,010 B1 | 8/2001 | Anderson |
| 6,279,124 B1 | 8/2001 | Brouwer et al. |
| 6,285,596 B1 | 9/2001 | Miura et al. |
| 6,330,593 B1 * | 12/2001 | Roberts ............... G06F 17/3005 707/E17.009 |
| 6,345,256 B1 | 2/2002 | Milsted et al. |
| 6,345,274 B1 * | 2/2002 | Zhu .................. G06F 17/30256 |
| 6,360,265 B1 | 3/2002 | Falck et al. |
| 6,363,381 B1 * | 3/2002 | Lee .................. G06F 17/30247 |
| 6,370,513 B1 * | 4/2002 | Kolawa .................. G06Q 30/02 705/15 |
| 6,374,260 B1 | 4/2002 | Hoffert et al. |
| 6,385,596 B1 | 5/2002 | Wiser |
| 6,418,421 B1 | 7/2002 | Hurtado et al. |
| 6,422,061 B1 | 7/2002 | Sunshine |
| 6,425,081 B1 * | 7/2002 | Iwamura ............... G06T 1/0021 705/58 |
| 6,434,520 B1 * | 8/2002 | Kanevsky ......... G06F 17/30746 704/243 |
| 6,438,556 B1 | 8/2002 | Malik et al. |
| 6,449,226 B1 | 9/2002 | Kumagai |
| 6,452,874 B1 | 9/2002 | Otsuka et al. |
| 6,453,252 B1 | 9/2002 | Laroche |
| 6,460,050 B1 | 10/2002 | Pace et al. |
| 6,463,508 B1 | 10/2002 | Wolf et al. |
| 6,477,704 B1 | 11/2002 | Cremia |
| 6,484,182 B1 * | 11/2002 | Dunphy ............ G06F 17/30958 700/231 |
| 6,487,641 B1 | 11/2002 | Cusson et al. |
| 6,490,279 B1 | 12/2002 | Chen et al. |
| 6,496,802 B1 | 12/2002 | van Zoest et al. |
| 6,526,411 B1 | 2/2003 | Ward |
| 6,542,869 B1 | 4/2003 | Foote |
| 6,550,001 B1 | 4/2003 | Corwin et al. |
| 6,550,011 B1 | 4/2003 | Sims, III |
| 6,570,991 B1 * | 5/2003 | Scheirer ................... G10H 1/00 381/110 |
| 6,591,245 B1 | 7/2003 | Klug |
| 6,609,093 B1 | 8/2003 | Gopinath et al. |
| 6,609,105 B2 | 8/2003 | van Zoest et al. |
| 6,628,737 B1 | 9/2003 | Timus |
| 6,636,965 B1 | 10/2003 | Beyda |
| 6,654,757 B1 | 11/2003 | Stern |
| 6,675,174 B1 | 1/2004 | Bolle et al. |
| 6,690,835 B1 * | 2/2004 | Brockmeyer .......... H04N 19/51 375/240.16 |
| 6,714,921 B2 * | 3/2004 | Stefik ....................... G06F 21/10 705/55 |
| 6,732,180 B1 | 5/2004 | Hale |
| 6,735,699 B1 | 5/2004 | Sasaki et al. |
| 6,763,069 B1 * | 7/2004 | Divakaran ......... G06K 9/00711 348/397.1 |
| 6,771,885 B1 | 8/2004 | Agnihotri et al. |
| 6,788,800 B1 * | 9/2004 | Carr ....................... G06Q 10/00 235/375 |
| 6,834,308 B1 * | 12/2004 | Ikezoye ................ G06F 17/3002 348/E7.071 |
| 6,868,440 B1 | 3/2005 | Gupta et al. |
| 6,947,909 B1 | 9/2005 | Hoke, Jr. |
| 6,961,858 B2 * | 11/2005 | Fransdonk ............... G06F 21/10 380/281 |
| 6,968,337 B2 | 11/2005 | Wold |
| 6,990,453 B2 * | 1/2006 | Wang ............... G06F 17/30743 704/270 |

(56) References Cited

U.S. PATENT DOCUMENTS

| | | | |
|---|---|---|---|
| 7,020,635 B2* | 3/2006 | Hamilton | G06Q 20/00 705/51 |
| 7,043,536 B1 | 5/2006 | Philyaw | |
| 7,058,223 B2 | 6/2006 | Cox et al. | |
| 7,080,049 B2* | 7/2006 | Truitt | G06Q 20/16 380/30 |
| 7,090,128 B2* | 8/2006 | Farley | H04L 67/2823 235/384 |
| 7,107,462 B2* | 9/2006 | Fransdonk | G06Q 20/12 380/282 |
| 7,150,045 B2* | 12/2006 | Koelle | G06F 21/552 726/26 |
| 7,181,398 B2 | 2/2007 | Thong et al. | |
| 7,194,752 B1* | 3/2007 | Kenyon | G10L 25/48 725/22 |
| 7,228,293 B2 | 6/2007 | DeTreville | |
| 7,263,205 B2 | 8/2007 | Lev | |
| 7,266,645 B2 | 9/2007 | Garg et al. | |
| 7,269,556 B2 | 9/2007 | Kiss et al. | |
| 7,281,272 B1 | 10/2007 | Rubin et al. | |
| 7,289,643 B2* | 10/2007 | Brunk | G06K 9/00744 382/100 |
| 7,334,720 B2* | 2/2008 | Hulst | G06F 21/10 235/380 |
| 7,349,552 B2 | 3/2008 | Levy et al. | |
| 7,363,278 B2 | 4/2008 | Schmelzer et al. | |
| 7,424,747 B2* | 9/2008 | DeTreville | G06Q 30/06 380/201 |
| 7,426,750 B2 | 9/2008 | Cooper et al. | |
| 7,443,797 B2 | 10/2008 | Cheung et al. | |
| 7,474,759 B2* | 1/2009 | Sternberg | G06F 17/30247 382/100 |
| 7,500,007 B2* | 3/2009 | Ikezoye | G06F 17/3002 705/39 |
| 7,529,659 B2 | 5/2009 | Wold | |
| 7,546,120 B1 | 6/2009 | Ulvenes et al. | |
| 7,562,012 B1 | 7/2009 | Wold | |
| 7,565,327 B2 | 7/2009 | Schmelzer | |
| 7,587,502 B2* | 9/2009 | Crawford | A63F 13/12 463/42 |
| 7,593,576 B2 | 9/2009 | Meyer et al. | |
| 7,613,686 B2* | 11/2009 | Rui | G06F 17/30256 |
| 7,630,562 B2* | 12/2009 | Gong | G06F 17/30802 375/240.08 |
| 7,653,210 B2* | 1/2010 | Rhoads | G06K 7/1417 382/100 |
| 7,701,941 B2 | 4/2010 | O'Callaghan et al. | |
| 7,707,088 B2 | 4/2010 | Schmelzer et al. | |
| 7,711,586 B2* | 5/2010 | Aggarwal | G06Q 10/02 700/14 |
| 7,711,652 B2 | 5/2010 | Schmelzer et al. | |
| 7,770,013 B2* | 8/2010 | Rhoads | G06F 17/241 713/176 |
| 7,797,249 B2 | 9/2010 | Schmelzer et al. | |
| 7,853,664 B1* | 12/2010 | Wang | G06Q 30/06 379/88.01 |
| 7,877,438 B2 | 1/2011 | Schrempp et al. | |
| 7,917,645 B2* | 3/2011 | Ikezoye | G06F 17/3002 709/203 |
| 7,942,317 B2* | 5/2011 | Racz | G06F 21/10 235/380 |
| 8,006,314 B2 | 8/2011 | Wold | |
| 8,033,458 B2* | 10/2011 | Hulst | G06F 21/10 235/380 |
| 8,061,598 B2* | 11/2011 | Racz | G06F 21/10 235/380 |
| 8,082,150 B2 | 12/2011 | Wold | |
| 8,086,445 B2 | 12/2011 | Wold | |
| 8,112,818 B2 | 2/2012 | Wold | |
| 8,122,339 B2* | 2/2012 | Bastos dos Santos | G06F 17/247 382/169 |
| 8,130,746 B2 | 3/2012 | Schrempp et al. | |
| 8,199,651 B1 | 6/2012 | Schrempp et al. | |
| 8,316,238 B2* | 11/2012 | Mergen | G06F 17/30864 713/176 |
| 8,332,326 B2 | 12/2012 | Schrempp et al. | |
| 8,458,156 B1* | 6/2013 | Sharifi | G06F 17/30038 707/705 |
| 8,472,669 B2* | 6/2013 | Sharma | G06T 7/246 348/169 |
| 8,484,691 B2 | 7/2013 | Schmelzer et al. | |
| 8,639,178 B2* | 1/2014 | Anniballi | H04H 60/44 348/729 |
| 8,645,279 B2 | 2/2014 | Schmelzer | |
| 8,732,858 B2 | 5/2014 | Wold | |
| 8,775,317 B2 | 7/2014 | Schmelzer | |
| 8,843,952 B2* | 9/2014 | Pora | H04N 21/254 348/553 |
| 8,862,795 B2* | 10/2014 | Castro Scorsi | G06F 5/16 710/53 |
| 8,886,635 B2* | 11/2014 | Cho | G06F 17/3074 707/722 |
| 8,972,481 B2 | 3/2015 | Schrempp et al. | |
| 9,049,468 B2* | 6/2015 | Ikezoye | G06F 17/3002 |
| 9,081,778 B2 | 7/2015 | Garside et al. | |
| 9,268,921 B2 | 2/2016 | Wold | |
| 9,374,183 B2* | 6/2016 | Anniballi | H04H 60/65 |
| 9,411,050 B1* | 8/2016 | Weber | G01S 19/13 |
| 9,461,759 B2* | 10/2016 | Anniballi | H04H 20/12 |
| 9,589,141 B2 | 3/2017 | Schmelzer | |
| 9,608,824 B2 | 3/2017 | Garside et al. | |
| 9,785,757 B2 | 10/2017 | Wold | |
| 9,949,044 B1* | 4/2018 | Choi, II | H04R 25/552 |
| 2001/0013061 A1 | 8/2001 | DeMartin | |
| 2001/0027493 A1 | 10/2001 | Wallace | |
| 2001/0027522 A1 | 10/2001 | Saito | |
| 2001/0034219 A1 | 10/2001 | Hewitt et al. | |
| 2001/0037304 A1 | 11/2001 | Paiz | |
| 2001/0041989 A1 | 11/2001 | Vilcauskas et al. | |
| 2001/0051996 A1 | 12/2001 | Cooper et al. | |
| 2001/0056430 A1 | 12/2001 | Yankowki | |
| 2002/0002899 A1* | 1/2002 | Gjerdingen | G06F 17/30743 84/667 |
| 2002/0019858 A1 | 2/2002 | Kaiser | |
| 2002/0023020 A1* | 2/2002 | Kenyon | G06Q 30/02 704/231 |
| 2002/0023220 A1* | 2/2002 | Kaplan | H04L 63/0823 713/176 |
| 2002/0037083 A1* | 3/2002 | Weare | G06F 17/30038 381/58 |
| 2002/0042754 A1 | 4/2002 | Del Beccaro et al. | |
| 2002/0049760 A1 | 4/2002 | Scott | |
| 2002/0064149 A1 | 5/2002 | Elliott et al. | |
| 2002/0069098 A1 | 6/2002 | Schmidt | |
| 2002/0072325 A1* | 6/2002 | Hayter | H04H 60/58 455/2.01 |
| 2002/0073316 A1* | 6/2002 | Collins | G06F 21/572 713/174 |
| 2002/0076051 A1* | 6/2002 | Nii | G06F 21/10 380/232 |
| 2002/0082999 A1 | 6/2002 | Lee | |
| 2002/0083060 A1* | 6/2002 | Wang | G06F 17/30743 |
| 2002/0087885 A1 | 7/2002 | Peled et al. | |
| 2002/0120577 A1 | 8/2002 | Hans et al. | |
| 2002/0123990 A1 | 9/2002 | Abe et al. | |
| 2002/0129140 A1 | 9/2002 | Peled et al. | |
| 2002/0133494 A1 | 9/2002 | Goedken | |
| 2002/0133499 A1* | 9/2002 | Ward | G06K 9/00523 |
| 2002/0141384 A1 | 10/2002 | Liu et al. | |
| 2002/0152262 A1 | 10/2002 | Arkin et al. | |
| 2002/0156737 A1 | 10/2002 | Kahn | |
| 2002/0157005 A1* | 10/2002 | Brunk | G06Q 20/401 713/176 |
| 2002/0158737 A1 | 10/2002 | Yokoyama | |
| 2002/0178410 A1* | 11/2002 | Haitsma | G06F 17/30787 714/709 |
| 2002/0184517 A1* | 12/2002 | Tadayon | G06F 21/10 726/27 |
| 2002/0186887 A1* | 12/2002 | Rhoads | G06K 7/1417 382/232 |

(56) References Cited

U.S. PATENT DOCUMENTS

| | | |
|---|---|---|
| 2002/0198789 A1 | 12/2002 | Waldman |
| 2003/0014530 A1 | 1/2003 | Bodin |
| 2003/0018709 A1 | 1/2003 | Schrempp et al. |
| 2003/0023852 A1* | 1/2003 | Wold ............... G06F 17/30017 713/176 |
| 2003/0033321 A1 | 2/2003 | Schrempp et al. |
| 2003/0037010 A1 | 2/2003 | Schmelzer et al. |
| 2003/0061352 A1 | 3/2003 | Bohrer |
| 2003/0051100 A1 | 5/2003 | Patel |
| 2003/0095660 A1 | 5/2003 | Lee et al. |
| 2003/0105739 A1* | 6/2003 | Essafi ..................... G06F 21/64 |
| 2003/0135623 A1 | 7/2003 | Schrempp et al. |
| 2003/0191719 A1 | 10/2003 | Ginter et al. |
| 2003/0191764 A1* | 10/2003 | Richards ........... G06F 17/30743 |
| 2003/0195852 A1 | 10/2003 | Campbell et al. |
| 2003/0223554 A1 | 12/2003 | Zhang |
| 2004/0008864 A1 | 1/2004 | Watson et al. |
| 2004/0010495 A1 | 1/2004 | Kramer et al. |
| 2004/0028281 A1* | 2/2004 | Cheng ..................... G06F 21/10 382/232 |
| 2004/0053654 A1 | 3/2004 | Kokumai et al. |
| 2004/0073513 A1 | 4/2004 | Stefik et al. |
| 2004/0089142 A1 | 5/2004 | Georges et al. |
| 2004/0133797 A1 | 7/2004 | Arnold |
| 2004/0148191 A1 | 7/2004 | Hoke, Jr. |
| 2004/0163106 A1 | 8/2004 | Schrempp et al. |
| 2004/0167858 A1 | 8/2004 | Erickson |
| 2004/0199387 A1* | 10/2004 | Wang ..................... G06Q 30/06 704/243 |
| 2004/0201784 A9 | 10/2004 | Dagtas et al. |
| 2005/0021783 A1 | 1/2005 | Ishii |
| 2005/0038819 A1* | 2/2005 | Hicken ............. G06F 17/30743 |
| 2005/0039000 A1 | 2/2005 | Erickson |
| 2005/0044189 A1 | 2/2005 | Ikezoye et al. |
| 2005/0097059 A1 | 5/2005 | Shuster |
| 2005/0141707 A1* | 6/2005 | Haitsma ............. G06F 17/3002 380/201 |
| 2005/0154678 A1 | 7/2005 | Schmelzer |
| 2005/0154680 A1 | 7/2005 | Schmelzer |
| 2005/0154681 A1 | 7/2005 | Schmelzer |
| 2005/0216433 A1 | 9/2005 | Bland et al. |
| 2005/0267945 A1 | 12/2005 | Cohen et al. |
| 2005/0289065 A1 | 12/2005 | Weare |
| 2006/0034177 A1 | 2/2006 | Schrempp |
| 2006/0062426 A1 | 3/2006 | Levy et al. |
| 2006/0118619 A1* | 6/2006 | Hulst ..................... G06F 21/10 235/380 |
| 2007/0033409 A1* | 2/2007 | Brunk ................. G06K 9/00744 713/176 |
| 2007/0074147 A1 | 3/2007 | Wold |
| 2007/0078769 A1 | 4/2007 | Way et al. |
| 2007/0124756 A1* | 5/2007 | Covell ............. G06F 17/30743 725/18 |
| 2007/0186229 A1 | 8/2007 | Conklin et al. |
| 2007/0226365 A1 | 9/2007 | Hildreth et al. |
| 2007/0271248 A1* | 11/2007 | Albernoz .......... G06F 17/30997 |
| 2008/0008173 A1 | 1/2008 | Kanevsky et al. |
| 2008/0019371 A1 | 1/2008 | Anschutz et al. |
| 2008/0133415 A1 | 6/2008 | Ginter et al. |
| 2008/0141379 A1 | 6/2008 | Schmelzer |
| 2008/0154730 A1 | 6/2008 | Schmelzer |
| 2008/0155116 A1 | 6/2008 | Schmelzer |
| 2008/0250080 A1 | 10/2008 | Arrasvuori et al. |
| 2008/0263579 A1* | 10/2008 | Mears ................. G11B 27/322 725/9 |
| 2008/0320545 A1* | 12/2008 | Schwartz ........... H04N 7/17318 725/135 |
| 2009/0019468 A1* | 1/2009 | Ganesan ........... G06F 17/30017 725/25 |
| 2009/0030651 A1 | 1/2009 | Wold |
| 2009/0031326 A1 | 1/2009 | Wold |
| 2009/0043870 A1 | 2/2009 | Ikezoye et al. |
| 2009/0063974 A1* | 3/2009 | Bull ................. G06F 17/30743 715/716 |
| 2009/0131152 A1 | 5/2009 | Busse |
| 2009/0132391 A1 | 5/2009 | Jacobs |
| 2009/0192640 A1 | 7/2009 | Wold |
| 2009/0240361 A1 | 9/2009 | Wold et al. |
| 2009/0306966 A1 | 12/2009 | Hejna, Jr. |
| 2009/0328236 A1 | 12/2009 | Schmelzer |
| 2010/0042843 A1* | 2/2010 | Brunk ................. G06Q 20/401 713/176 |
| 2010/0061560 A1* | 3/2010 | Cronin ..................... H03G 3/32 381/57 |
| 2010/0104259 A1 | 4/2010 | Shakya et al. |
| 2010/0281042 A1 | 11/2010 | Windes et al. |
| 2010/0290667 A1 | 11/2010 | Lienhart et al. |
| 2010/0290867 A1 | 11/2010 | Leinhart et al. |
| 2011/0069230 A1* | 3/2011 | Polumbus ......... G06F 17/30746 348/468 |
| 2011/0078719 A1* | 3/2011 | Kenyon ................. G10L 25/48 725/19 |
| 2011/0114723 A1* | 5/2011 | Hulst ..................... G06F 21/10 235/382 |
| 2011/0119149 A1* | 5/2011 | Ikezoye ............. G06F 17/3002 705/26.7 |
| 2012/0124679 A1 | 5/2012 | Wold |
| 2012/0223135 A1* | 9/2012 | Meek ..................... G06Q 30/02 235/379 |
| 2012/0318071 A1 | 12/2012 | Biehl et al. |
| 2013/0011008 A1* | 1/2013 | Ikezoye ............. G06F 17/3002 382/100 |
| 2013/0159021 A1 | 6/2013 | Felsher |
| 2013/0276138 A1 | 10/2013 | Schmelzer |
| 2013/0318071 A1* | 11/2013 | Cho ................. G06F 17/3074 707/722 |
| 2013/0318114 A1* | 11/2013 | Emerson, III .... G06F 17/30386 707/758 |
| 2014/0056433 A1* | 2/2014 | Emerson, III .... G06F 17/30743 381/56 |
| 2014/0089307 A1 | 3/2014 | Garside et al. |
| 2014/0115716 A1 | 4/2014 | Schmelzer |
| 2014/0215643 A1 | 7/2014 | Wold |
| 2014/0335834 A1* | 11/2014 | Emerson, III .... G06F 17/30743 455/414.1 |
| 2014/0336798 A1* | 11/2014 | Emerson, III ........ G10L 19/018 700/94 |
| 2014/0336799 A1* | 11/2014 | Emerson, III ........ G10L 19/018 700/94 |
| 2014/0357234 A1* | 12/2014 | Sullivan ................. H04W 4/06 455/412.1 |
| 2015/0078575 A1* | 3/2015 | Selig ..................... H04R 1/1091 381/74 |
| 2015/0154273 A1 | 6/2015 | Schrempp et al. |
| 2015/0234814 A1* | 8/2015 | Ikezoye ............. G06F 17/3002 705/51 |
| 2015/0270976 A1 | 9/2015 | Garside et al. |
| 2016/0132664 A1 | 5/2016 | Wold |
| 2016/0203824 A1* | 7/2016 | Park ..................... G10L 19/018 700/94 |
| 2017/0193104 A1 | 7/2017 | Garside et al. |
| 2017/0366847 A1* | 12/2017 | Covell ................. H04N 21/4542 |
| 2018/0032705 A1 | 2/2018 | Wold |

FOREIGN PATENT DOCUMENTS

| | | |
|---|---|---|
| EP | 0459046 A1 | 12/1991 |
| EP | 0517405 A2 | 5/1992 |
| EP | 0689316 A2 | 12/1995 |
| EP | 0731446 | 9/1996 |
| EP | 0859503 | 8/1998 |
| EP | 0459046 | 4/1999 |
| EP | 01449103 B1 | 8/2004 |
| EP | 01485815 B1 | 12/2004 |
| EP | 1492767 | 9/2005 |
| EP | 01593018 A2 | 11/2005 |
| EP | 1354276 B1 | 12/2007 |
| EP | 1485815 B1 | 10/2009 |
| EP | 177191 B1 | 2/2012 |
| EP | 1449103 B1 | 3/2012 |
| GB | 2464049 | 12/2012 |

(56) References Cited

FOREIGN PATENT DOCUMENTS

| WO | WO 96/36163 A3 | 11/1996 |
|---|---|---|
| WO | WO 98/20672 A3 | 5/1998 |
| WO | WO 00/05650 A1 | 2/2000 |
| WO | WO 00/39954 A1 | 7/2000 |
| WO | WO 00/63800 A1 | 10/2000 |
| WO | WO 01/23981 A1 | 4/2001 |
| WO | WO 2001/062004 | 8/2001 |
| WO | WO 02/03203 | 1/2002 |
| WO | WO 02/15035 | 2/2002 |
| WO | WO 2002/027600 A2 | 4/2002 |
| WO | WO 02/037316 | 5/2002 |
| WO | 02086803 | 10/2002 |
| WO | WO 02/082271 | 10/2002 |
| WO | WO 03/007235 A1 | 1/2003 |
| WO | WO 03/009149 A1 | 1/2003 |
| WO | WO 03/036496 A1 | 5/2003 |
| WO | WO 03/067459 A1 | 8/2003 |
| WO | WO 03/091990 A1 | 11/2003 |
| WO | WO 04/044820 A1 | 5/2004 |
| WO | WO 2003/007235 A3 | 7/2004 |
| WO | WO 04/070558 | 8/2004 |
| WO | WO 06/015168 A2 | 2/2006 |
| WO | WO 09/017710 | 2/2009 |

OTHER PUBLICATIONS

Baum, L., et al., "A Maximization Technique Occurring in the Statistical Analysis of Probabilistic Functions of Markov Chains," *The Annals of Mathematical Statistics*, vol. 41, No. 1, pp. 164-171, 1970.

Beritelli, F., et al., "Multilayer Chaotic Encryption for Secure Communications in packet switching Networks," IEEE, vol. 2Aug. 2000, pp. 1575-1582.

Blum, T., Keislar, D., Wheaton, J., and Wold, E., "Audio Databases with Content-Based Retrieval," Proceedings of the 1995 International Joint Conference on Artificial Intelligence (IJCAI) Workshop on Intelligent Multimedia Information Retrieval, 1995.

Breslin, Pat, et al., Relatable Website, "Emusic uses Relatable's open source audio recognition solution, TRM, to signature its music catabblog for MusicBrainz database," http://www.relatable.com/news/pressrelease/001017.release.html, Oct. 17, 2000.

Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.

Business Wire, "IBM: IBM Announces New Descrambler Software; First to Offer Software to Work With Digital Video Chips," Jun. 5, 25, 1997, 07:49.

Chen, et al., Yong-Cong, A Secure and Robust Digital Watermaking Technique by the Blcok Cipher RC6 and Secure Hash Algorithm, Deparment of Computer Science, National Tsing Hua University, 2001.

Cosi, P., De Poli, G., Prandoni, P., "Timbre Characterization with Mel-Cepstrum and Neural Nets," Proceedings of the 1994 International Computer Music Conference, pp. 42-45, San Francisco, No date.

Dempster, A.P., et al., "Maximum Likelihood from Incomplete Data via the EM Algorithm" *Journal of the Royal Statistical Society, Series B (Methodological)*, vol. 39, Issue 1, pp. 31-38, 1977.

Feiten, B. and Gunzel, S., "Automatic Indexing of a Sound Database Using Self-Organizing Neural Nets," Computer Music Journal, 18:3, pp. 53-65, Fall 1994.

Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.

Foote, J., "A Similarity Measure for Automatic Audio Classification," Institute of Systems Science, National University of Singapore, 1977, Singapore.

Gasaway Laura, Close of Century Sees New Copyright Amendments, Mar. 200, Information Outlook, 4, 3, 42.

Gonzalez, R. and Melih, K., "Content Based Retrieval of Audio," The Institute for Telecommunication Research, University of Wollongong, Australia, No date.

Haitsma, J., et al., "Robust Audio Hashing for Content Identification", CBMI 2001, Second International Workshop on Content Based Multimedia and Indexing, Brescia, Italy, Sep. 19-21, 2001.

Harris, Lesley Ellen, "To register or not," Mar. 2006, Information Outlook, 10, 3, 32(s).

Kanth, K.V. et al. "Dimensionality Reduction or Similarity Searching in Databases," Computer Vision and Image understanding, vol. 75, Nos. 1/2 Jul./Aug. 1999, pp. 59-72, Academic Press. Santa Barbara, CA, USA.

Keislar, D., Blum, T., Wheaton, J., and Wold, E., "Audio Analysis for Content-Based Retrieval" Proceedings of the 1995 International Computer Music Conference.

Ohtsuki, K., et al. , "Topic extraction based on continuous speech recognition in broadcast-news speech," Proceedings IEEE Workshop on Automated Speech Recognition and Understanding, 1997, pp. 527-534, N.Y., N.Y., USA.

Packethound Tech Specs, www.palisdesys.com/products/packethount/tck specs/prodPhtechspecs.shtml, 2002.

"How does PacketHound work?", www.palisdesys.com/products/packethound/how_does_it_work/prod_Pghhow.shtml 2002.

Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.

Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.

Reynolds, D., et al. , "Robust Text-Independent Speaker Identification Using Gaussian Mixture Speaker Models", *IEEE Transactions on Speech and Audio Processing*, vol. 3, No. 1, pp. 72-83 Jan. 1995.

Scheirer, E., Slaney, M., "Construction and Evaluation of a Robust Multifeature Speech/Music Discriminator," pp. 1-4, Proceedings of ICASSP-97, Apr. 2-24, Munich, Germany.

Scheirer, E.D., "Tempo and Beat Analysis of Acoustic Musical Signals," Machine Listening Group, E15-401D MIT Media Laboratory, pp. 1-21, Aug. 8, 1997, Cambridge, MA.

Smith, Alan J., "Cache Memories," Computer Surveys, Sep. 1982, University of California, Berkeley, California, vol. 14, No. 3, pp. 1-61.

Vertegaal, R. and Bonis, E., "ISEE: An Intuitive Sound Editing Environment," Computer Music Journal, 18:2, pp. 21-22, Summer 1994.

Wang, Yao, et al., "Multimedia Content Analysis," IEEE Signal Processing Magazine, pp. 12-36, Nov. 2000, IEEE Service Center, Piscataway, N.J., USA.

Wold, Erling, et al., "Content Based Classification, Search and Retrieval of Audio," IEEE Multimedia, vol. 3, No. 3, pp. 27-36, 1996 IEEE Service Center, Piscataway, N.J., USA.

Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.

European Patent Application No. 02752347.1, Supplementary European Search Report dated May 8, 2006, 4 pages.

European Patent Application No. 02756525.8, Supplementary European Search Report dated Jun. 28, 2006, 4 pages.

European Patent Application No. 02782170, Supplementary European Search Report dated Feb. 7, 2007, 4 pages.

European Patent Application No. 02725522.3, Supplementary European Search Report dated May 12, 2006, 2 Pages.

European Patent Application No. 04706547.9 European Search Report dated Feb. 25, 2010, 3 Pages.

European Patent Application No. 05778109.8 European Search Report dated Sep. 10, 2010, 7 Pages.

PCT Search Report PCT/US01/50295, International Search Report dated May 14, 2003, 5 Pages.

PCT Search Report PCT/US02/10615, International Search Report dated Aug. 7, 2002, 5 Pages.

PCT Search Report PCT/US02/33186, International Search Report dated Dec. 16, 2002, 6 Pages.

(56) References Cited

OTHER PUBLICATIONS

PCT Search Report PCT/US04/02748, International Search Report and Written Opinion dated Aug. 20, 2007, 8 Pages.
PCT Search Report PCT/US05/26887, International Search Report dated May 3, 2006, 3 Pages.
PCT Search Report PCT/US08/09127, International Search Report dated Oct. 30, 2008, 8 Pages.
Audible Magic Office Action for U.S. Appl. No. 09/511,632 dated Dec. 4, 2002.
Audible Magic Office Action for U.S. Appl. No. 09/511,632 dated May 13, 2003.
Audible Magic Office Action for U.S. Appl. No. 09/511,632 dated Aug. 27, 2003.
Audible Magic Office Action for U.S. Appl. No. 09/511,632 dated Feb. 5, 2004.
Audible Magic Notice of Allowance for U.S. Appl. No. 09/511,632 dated Aug. 10, 2004.
Audible Magic Notice of Allowance for U.S. Appl. No. 10/955,841 dated Sep. 25, 2006.
Audible Magic Notice of Allowance for U.S. Appl. No. 10/955,841 dated Mar. 23, 2007.
Audible Magic Notice of Allowance for U.S. Appl. No. 10/955,841 dated Sep. 11, 2007.
Audible Magic Notice of Allowance for U.S. Appl. No. 10/955,841 dated Feb. 25, 2008.
Audible Magic Notice of Allowance for U.S. Appl. No. 12/251,404 dated May 14, 2010.
Audible Magic Office Action for U.S. Appl. No. 08/897,662 dated Aug. 13, 1998.
Audible Magic Notice of Allowance for U.S. Appl. No. 08/897,662 dated Jan. 29, 1999.
Audible Magic Office Action for U.S. Appl. No. 09/706,227 dated May 5, 2004.
Audible Magic Office Action for U.S. Appl. No. 09/706,227 dated Nov. 12, 2004.
Audible Magic Office Action for U.S. Appl. No. 09/706,227 dated May 9, 2005.
Audible Magic Office Action for U.S. Appl. No. 09/706,227 dated Nov. 1, 2005.
Audible Magic Office Action for U.S. Appl. No. 09/706,227 dated Jun. 23, 2006.
Audible Magic Office Action for U.S. Appl. No. 09/706,227 dated Nov. 7, 2006.
Audible Magic Office Action for U.S. Appl. No. 09/706,227 dated Mar. 29, 2007.
Audible Magic Office Action for U.S. Appl. No. 09/706,227 dated Sep. 17, 2007.
Audible Magic Office Action for U.S. Appl. No. 09/706,227 dated May 29, 2008.
Audible Magic Office Action for U.S. Appl. No. 09/706,227 dated Jan. 9, 2009.
Audible Magic Office Action for U.S. Appl. No. 10/192,783 dated Dec. 13, 2004.
Audible Magic Notice of Allowance for U.S. Appl. No. 10/192,783 dated Jun. 7, 2005.
Audible Magic Office Action for U.S. Appl. No. 11/239,543 dated Apr. 23, 2008.
Audible Magic Notice of Allowance for U.S. Appl. No. 11/239,543 dated Nov. 6, 2008.
Audible Magic Notice of Allowance for U.S. Appl. No. 11/239,543 dated Feb. 25, 2009.
Audible Magic Office Action for U.S. Appl. No. 12/410,445 dated Aug. 10, 2010.
Audible Magic Notice of Allowance for U.S. Appl. No. 12/410,445 dated Oct. 20, 2010.
Audible Magic Office Action for U.S. Appl. No. 09/910,680 dated Nov. 17, 2004.
Audible Magic Office Action for U.S. Appl. No. 09/910,680 dated May 16, 2005.
Audible Magic Office Action for U.S. Appl. No. 09/910,680 dated Sep. 29, 2005.
Audible Magic Office Action for U.S. Appl. No. 09/910,680 dated Jun. 23, 2006.
Audible Magic Office Action for U.S. Appl. No. 09/910,680 dated Aug. 8, 2006.
Audible Magic Office Action for U.S. Appl. No. 09/910,680 dated Jan. 25, 2007.
Audible Magic Office Action for U.S. Appl. No. 09/910,680 dated Dec. 5, 2007.
Audible Magic Office Action for U.S. Appl. No. 09/999,763 dated Apr. 6, 2005.
Audible Magic Office Action for U.S. Appl. No. 09/999,763 dated Oct. 6, 2005.
Audible Magic Office Action for U.S. Appl. No. 09/999,763 dated Apr. 7, 2006.
Audible Magic Office Action for U.S. Appl. No. 09/999,763 dated Oct. 6, 2006.
Audible Magic Office Action for U.S. Appl. No. 09/999,763 dated Mar. 7, 2007.
Audible Magic Office Action for U.S. Appl. No. 09/999,763 dated Aug. 20, 2007.
Audible Magic Office Action for U.S. Appl. No. 09/999,763 dated Jan. 7, 2008.
Audible Magic Office Action for U.S. Appl. No. 09/999,763 dated Jun. 27, 2008.
Audible Magic Office Action for U.S. Appl. No. 09/999,763 dated Dec. 22, 2008.
Audible Magic Office Action for U.S. Appl. No. 09/999,763 dated Jul. 20, 2009.
Audible Magic Office Action for U.S. Appl. No. 09/999,763 dated Dec. 21, 2009.
Audible Magic Office Action for U.S. Appl. No. 09/999,763 dated Jun. 23, 2010.
Audible Magic Notice of Allowance for U.S. Appl. No. 09/999,763 dated Sep. 16, 2010.
Audible Magic Office Action for U.S. Appl. No. 10/072,238 dated May 3, 2005.
Audible Magic Notice of Allowance for U.S. Appl. No. 10/072,238 dated May 3, 2005.
Audible Magic Office Action for U.S. Appl. No. 10/072,238 dated Oct. 25, 2005.
Audible Magic Office Action for U.S. Appl. No. 10/072,238 dated Apr. 25, 2006.
Audible Magic Office Action for U.S. Appl. No. 10/072,238 dated Sep. 19, 2007.
Audible Magic Office Action for U.S. Appl. No. 10/072,238 dated Apr. 7, 2008.
Audible Magic Office Action for U.S. Appl. No. 10/072,238 dated Oct. 1, 2008.
Audible Magic Office Action for U.S. Appl. No. 10/072,238 dated Jan. 9, 2009.
Audible Magic Office Action for U.S. Appl. No. 10/072,238 dated Mar. 31, 2009.
Audible Magic Office Action for U.S. Appl. No. 10/072,238 dated Aug. 6, 2010.
Audible Magic Office Action for U.S. Appl. No. 11/116,710 dated Dec. 13, 2004.
Audible Magic Office Action for U.S. Appl. No. 11/116,710 dated Apr. 8, 2005.
Audible Magic Office Action for U.S. Appl. No. 11/116,710 dated Oct. 7, 2005.
Audible Magic Office Action for U.S. Appl. No. 11/116,710 dated Apr. 20, 2006.
Audible Magic Office Action for U.S. Appl. No. 11/116,710 dated Jul. 31, 2006.
Audible Magic Office Action for U.S. Appl. No. 11/116,710 dated Jan. 16, 2007.
Audible Magic Notice of Allowance for U.S. Appl. No. 11/116,710 dated Nov. 19, 2007.
Audible Magic Notice of Allowance for U.S. Appl. No. 12/042,023 dated Dec. 29, 2008.

(56) References Cited

OTHER PUBLICATIONS

Audible Magic Notice of Allowance for U.S. Appl. No. 12/042,023 dated Jun. 25, 2009.
Audible Magic Notice of Allowance for U.S. Appl. No. 12/042,023 dated Mar. 8, 2010.
Audible Magic Office Action for U.S. Appl. No. 11/048,307 dated Aug. 22, 2007.
Audible Magic Office Action for U.S. Appl. No. 11/048,307 dated May 16, 2008.
Audible Magic Notice of Allowance for U.S. Appl. No. 11/048,307 dated May 29, 2009.
Audible Magic Office Action for U.S. Appl. No. 12/488,504 dated Nov. 10, 2010.
Audible Magic Office Action for U.S. Appl. No. 11/048,308 dated Feb. 25, 2008.
Audible Magic Office Action for U.S. Appl. No. 11/048,308 dated Mar. 5, 2009.
Audible Magic Notice of Allowance for U.S. Appl. No. 11/048,308 dated Aug. 7, 2009.
Audible Magic Office Action for U.S. Appl. No. 11/048,338 dated Apr. 18, 2007.
Audible Magic Office Action for U.S. Appl. No. 11/048,338 dated Oct. 11, 2007.
Audible Magic Office Action for U.S. Appl. No. 11/048,338 dated Jan. 14, 2008.
Audible Magic Office Action for U.S. Appl. No. 11/048,338 dated Jul. 9, 2008.
Audible Magic Office Action for U.S. Appl. No. 11/048,338 dated Jan. 7, 2009.
Audible Magic Office Action for U.S. Appl. No. 11/048,338 dated Jul. 6, 2009.
Audible Magic Office Action for U.S. Appl. No. 11/048,338 dated Dec. 28, 2009.
Audible Magic Office Action for U.S. Appl. No. 11/048,338 dated Jun. 24, 2010.
Audible Magic Office Action for U.S. Appl. No. 12/035,599 dated Nov. 17, 2008.
Audible Magic Office Action for U.S. Appl. No. 12/035,599 dated May 29, 2009.
Audible Magic Office Action for U.S. Appl. No. 12/035,599 dated Nov. 24, 2009.
Audible Magic Office Action for U.S. Appl. No. 12/035,599 dated Jun. 9, 2010.
Audible Magic Office Action for U.S. Appl. No. 12/035,609 dated Dec. 29, 2008.
Audible Magic Office Action for U.S. Appl. No. 12/035,609 dated Jun. 24, 2009.
Audible Magic Notice of Allowance for U.S. Appl. No. 12/035,609 dated Dec. 11, 2009.
Audible Magic Notice of Allowance for U.S. Appl. No. 12/277,291 dated May 12, 2010.
Audible Magic Office Action for U.S. Appl. No. 10/356,318 dated May 24, 2006.
Audible Magic Office Action for U.S. Appl. No. 10/356,318 dated Nov. 2, 2006.
Audible Magic Office Action for U.S. Appl. No. 10/356,318 dated Apr. 11, 2007.
Audible Magic Office Action for U.S. Appl. No. 10/356,318 dated Nov. 1, 2007.
Audible Magic Office Action for U.S. Appl. No. 10/356,318 dated May 9, 2008.
Audible Magic Office Action for U.S. Appl. No. 10/356,318 dated Jan. 6, 2009.
Audible Magic Office Action for U.S. Appl. No. 10/356,318 dated Jun. 15, 2009.
Audible Magic Office Action for U.S. Appl. No. 10/356,318 dated Jan. 21, 2010.
Audible Magic Office Action for U.S. Appl. No. 10/356,318 dated Jan. 7, 2011.
Audible Magic Office Action for U.S. Appl. No. 11/191,493 dated Jul. 17, 2008.
Audible Magic Office Action for U.S. Appl. No. 11/191,493 dated Jan. 9, 2009.
Audible Magic Office Action for U.S. Appl. No. 11/191,493 dated Apr. 28, 2009.
Audible Magic Office Action for U.S. Appl. No. 11/191,493 dated Nov. 19, 2009.
Audible Magic Office Action for U.S. Appl. No. 11/191,493 dated May 25, 2010.
Audible Magic Office Action for U.S. Appl. No. 11/191,493 dated Oct. 4, 2010.
Audible Magic Office Action for U.S. Appl. No. 11/829,662 dated Oct. 8, 2010.
Audible Magic Office Action for U.S. Appl. No. 11/923,491 dated Nov. 12, 2010.
Albert, Douglas, et al., "Combatting Software Piracy by encryption and key management," IEEE Computer Society, vol. 17. No. 4, Apr. 1984, 6 pages.
Audible Magic Corporation, "Audio Identification Technology Provides the Cornerstone for Online Distribution," 2000, http://www.audiblemagic.com/documents/Technology_Summary.pdf.
USPTO Office Action for U.S. Appl. No. 12/482,313 dated Feb. 4, 2011.
USPTO Notice of Allowance for U.S. Appl. No. 12/482,313 dated Aug. 23, 2011.
USPTO Notice of Allowance for U.S. Appl. No. 12/410,445 dated Aug. 12, 2011.
USPTO Office Action for U.S. Appl. No. 09/910,680 dated May 21, 2013.
USPTO Office Action for U.S. Appl. No. 12/488,504 dated Apr. 26, 2013.
USPTO Office Action for U.S. Appl. No. 12/035,599 dated Jun. 9, 2010.
USPTO Office Action for U.S. Appl. No. 12/035,599 dated Aug. 7, 2012.
USPTO Notice of Allowance for U.S. Appl. No. 12/035,599 dated Mar. 11, 2013.
USPTO Office Action for U.S. Appl. No. 10/356,318 dated Jun. 17, 2011.
USPTO Notice of Allowance for U.S. Appl. No. 10/356,318 dated Oct. 16, 2012.
USPTO Notice of Allowance for U.S. Appl. No. 11/191,493 dated Feb. 17, 2011.
USPTO Notice of Allowance for U.S. Appl. No. 11/923,491 dated Sep. 29, 2011.
USPTO Office Action for U.S. Appl. No. 13/355,424 dated Jan. 18, 2013.
USPTO Office Action for U.S. Appl. No. 13/355,424 dated May 24, 2013.
USPTO Office Action for U.S. Appl. No. 12/405,174 dated Mar. 2, 2011.
USPTO Office Action for U.S. Appl. No. 12/405,174 dated Sep. 9, 2011.
USPTO Office Action for U.S. Appl. No. 13/011,776 dated Jul. 10, 2013.
USPTO Office Action for U.S. Appl. No. 12/488,504 dated May 23, 2013.
USPTO Notice of Allowance for U.S. Appl. No. 12/488,504 dated Sep. 13, 2013.
USPTO Notice of Allowance for U.S. Appl. No. 11/829,662 dated Apr. 11, 2011.
USPTO Office Action for U.S. Appl. No. 13/915,511 dated Aug. 23, 2013.
Lin, et al., "Generating Robust Digital Signature for Image/Video Authentication," Proc. Multimedia and Security workshop at ACM Multimedia'98, Sep. 1, 1998, pp. 49-54.
USPTO Office Action for U.S. Appl. No. 13/011,776 dated Feb. 5, 2013.
USPTO Office Action for U.S. Appl. No. 13/011,776 dated Jul. 19, 2013.
USPTO Office Action for U.S. Appl. No. 13/011,776 dated Dec. 13, 2013.

(56) References Cited

OTHER PUBLICATIONS

USPTO Office Action for U.S. Appl. No. 09/910,680 dated Dec. 31, 2013.
USPTO Notice of Allowance for U.S. Appl. No. 13/915,511 dated Feb. 18, 2014.
USPTO Notice of Allowance for U.S. Appl. No. 13/355,424 dated Jan. 3, 2014.
USPTO Notice of Allowance for U.S. Appl. No. 12/405,174 dated Jan. 4, 2012.
International Search Report & Written Opinion dated Apr. 15, 2014, for PCT/US2013/061750.
USPTO Office Action for U.S. Appl. No. 13/620,144 dated May 29, 2014.
USPTO Notice of Allowance for U.S. Appl. No. 09/910,680 dated Nov. 5, 2014.
USPTO Office Action for U.S. Appl. No. 13/626,709 dated Oct. 12, 2014.
USPTO Office Action for U.S. Appl. No. 14/245,630 dated Jun. 18, 2015.
USPTO Notice of Allowance for U.S. Appl. No. 14/245,630 dated Sep. 24, 2015.
USPTO Office Action for U.S. Appl. No. 14/139,643 dated Dec. 2, 2014.
Kunio Kashino et al, "Robust Search Methods for Music Signals Based on Simple Representation", 2007 IEEE International Conference on Acoustics, Speech, and Signal Processing Apr. 15-20, 2007 Honolulu, HI, USA, Piscataway, NJ, USA, (Oct. 23, 2007), doi:10.1109/ICASSP.2007.367346, ISBN 978-1-4244-0727-9, pp. IV-1421, XP055296602 [X] 1-15.
Jaap Haitsma et al, "A Highly Robust Audio Fingerprinting System With an Efficient Search Strategy", Journal of New Music Research, Lisse, doi:10.1076/jnmr.32.2.211.16746, (Oct. 17, 2002), pp. 211-221, URL: http://www.cs.northwestern.edu/—pardo/courses/casa2009/casa_papers_2009/papers/audio fingerprint-haitsma.pdf, (Mar. 18, 2016), XP055259740 [X] 1-15.
Cong Jin et al, "Applications of digital fingerprinting and digital watermarking for E-commerce security mechanism", Audio, Language and Image Processing, 2008. ICALIP 2008. International Conference on, IEEE, Piscataway, NJ, USA, (Jul. 7, 2008), ISBN 978-1-4244-1723-0, pp. 536-540, XP031298539 [A] 1-15.
USPTO Non-Final Office Action for U.S. Appl. No. 14/139,643 dated Jun. 7, 2016.
USPTO Non-Final Office Action for U.S. Appl. No. 14/733,578 dated Mar. 23, 2016.
USPTO Notice of Allowance for U.S. Appl. No. 14/733,578 dated Nov. 8, 2016.
USPTO Notice of Allowance for U.S. Appl. No. 14/139,643 dated Oct. 21, 2016.
USPTO Office Action for U.S. Appl. No. 14/610,983 dated Feb. 6, 2013.
USPTO Office Action for U.S. Appl. No. 14/610,983 dated Jul. 10, 2013.
USPTO Office Action for U.S. Appl. No. 14/610,983 dated Dec. 10, 2013.
USPTO Office Action for U.S. Appl. No. 14/610,983 dated Jun. 5, 2014.
USPTO Office Action for U.S. Appl. No. 14/610,983 dated Jan. 28, 2015.
USPTO Office Action for U.S. Appl. No. 14/610,983 dated Aug. 17, 2015.
USPTO Office Action for U.S. Appl. No. 14/610,983 dated Mar. 16, 2016.
USPTO Office Action for U.S. Appl. No. 14/610,983 dated Nov. 7, 2016.
White, R., "How Computers Work," Oct. 15, 2003, Que Publishing, 7th Ed., 23 pages.
European Patent Application No. 13840744.0 extended European Search Report dated Sep. 5, 2016, 9 pages.
USPTO Non-Final Office Action for U.S. Appl. No. 14/610,983 dated May 2, 2017.
USPTO Final Office Action for U.S. Appl. No. 14/610,983 dated Nov. 1, 2017.
USPTO Non-Final Office Action for U.S. Appl. No. 14/699,850 dated May 3, 2017.
USPTO Final Office Action for U.S. Appl. No. 14/699,850 dated Nov. 15, 2017.

\* cited by examiner

METHOD AND APPARATUS FOR IDENTIFYING MEDIA CONTENT PRESENTED ON A MEDIA PLAYING DEVICE

RELATED APPLICATIONS

This application is a continuation of U.S. patent application Ser. No. 12/251,404, filed on Oct. 14, 2008 now U.S. Pat. No. 7,917,645, which is a continuation of U.S. patent application Ser. No. 10/955,841, filed Sep. 29, 2004, now U.S. Pat. No. 7,500,007, which is a continuation of U.S. patent application Ser. No. 09/511,632, filed on Feb. 17, 2000, now U.S. Pat. No. 6,834,308. U.S. patent application Ser. No. 12/251,404, U.S. Pat. No. 7,500,007, and U.S. Pat. No. 6,834,308 are hereby incorporated by reference.

BACKGROUND OF THE INVENTION

1. Field of the Invention

This invention pertains generally to media content identification methods. More particularly, the invention is an apparatus and method for identifying media content presented on a media playing device and presenting media-content related information and/or action to the user of the media playing device.

2. The Prior Art

The use of a data processing means, such as a computer or personal digital assistant (PDA), for playing works is well known. For purposes of the present discussion, a work is anything that is fixed in a tangible medium. Some examples of works include, but are not limited to, audio renderings, video renderings, images, video/audio renderings, and software. An example of an audio rendering is a song or other audio track. Examples of video renderings include animation or video sequence. Examples of an image include photographs and paintings. Examples of audio/video renderings include movies, television shows, and cartoons. Examples of software include word processing programs and video games.

Some examples of playing a work include using a personal computer (PC) to play songs from audio compact disks (CD), normally with the use of a CD-ROM drive, a sound card, and speakers. Other types of media, including various formats of audio and video, are also commonly played using a PC.

With the increasing popularity of the global information network commonly known as the "Internet", various audio and video formats have been introduced to provide live (as well as archived) broadcasts of works over the Internet. These broadcasts may be viewed by users connected to the Internet with the use of a PC and the proper client application. For example, Real Networks™ provides Real Player™ (a client application) for playing streaming audio and video works (in Real™ format) which is broadcast over the Internet. Various servers (also connected to the Internet) carry out the operation of making such works available and streaming data for the appropriate works to users upon request. In this way, Real™ media content of the work may be played by a user using Real Player™ on the user's PC. Like other media client applications, Real Player™ plays audio content of a work via the user's sound card and speakers and video content of a work via the user's video card and monitor (or other viewing device).

Internet radio broadcasts (or webcasts) are also known in the art. In general, Internet radio broadcasts are provided over the Internet by one or more server computers equipped to provide streaming audio works, much like traditional AM or FM radio broadcast. A user that would like to listen to an Internet radio broadcast would use a client application (such as Real Player™, Microsoft™ media player, or Apple QuickTime™ viewer, for example) and direct the client application to the appropriate server computer. The server computer then transmits the media content of a work to the client application via the Internet. The client application receives the media content of the work transmitted from the server computer and plays the content of the work using the user's sound card and speaker.

Internet video broadcasts (another form of webcast) are carried out in a similar fashion to that of Internet radio broadcasts, except video broadcasts typically contain both audio and video content of a work. As such, the audio component of the work is played to the user via a sound card and speakers, while the video component of the work is displayed using a video card and a monitor.

In many cases, webcasts will not provide content identifying information, such as song title, artist name or album name, as part of a broadcast work. Other information, such as where the content of the work can be purchased in the form of a CD, DVD (digital video disk) or VHS (video home system) tape, for example, are also typically not included. The primary reason a webcast provider (station) fails to provide such content-related information of the work is that the station does not have real-time access to accurate playlists. For example, it is common for a station disk jockey to make real-time adjustments to the playlist order and timing. Thus current radio station systems do not transmit or attach identification data of a work with the broadcast.

In addition to webcasts, many Internet sites provide archived or pre-recorded works for download and playback on a user's PC. Examples of such content of works include "way", "mp3", "mov", and "midi" files, among others. Once these files have been downloaded from the Internet site to the user's PC, the user is able to play back the audio or video content of a work using an appropriate client application. Many of these media files, like webcasts, also fail to provide identifying data or other information for a work.

Additionally, PCs often have the ability to play other forms of media content for other works via PC sound card and speakers and/or PC video card and monitor. For example, tuner expansion cards (tuners) which may be inserted into (or interfaced with) a user's PC are presently available (some computers already include such tuners). In either case, "television" (TV) tuners allow a user of the PC to view conventional television, cable or satellite transmissions on the PC monitor and hear the audio via the PC speaker. "Radio" tuners allow a user to hear conventional (FM or AM) radio broadcast using the PC speaker. Conventional TV and radio broadcast also fail to provide rich content-related information of a work to the user.

Other media playing devices such as televisions, radio/stereo systems, and portable audio devices also typically do not provide content-related information of a work on demand for the user. For example, in automobiles, current car stereo systems fail to provide a system and method for identifying a song being played on the stereo. Typically a user would either rely on the disk jockey to identify the artist and song title or call the radio station to ascertain the information.

Users may also read and/or store media content of works from storage mediums such as compact disk and magnetic tapes. Sometimes these copies of works do not include metadata or the metadata for the work may be incorrect. Furthermore, there may be no proper way to identify the work.

Accordingly, there is a need for an apparatus and method which provides real-time media content-related information of a work and context specific action choices to users viewing and/or listening to media content of the work over media playing devices. The present invention satisfies these needs, as well as others, and generally overcomes the deficiencies found in the background art.

BRIEF DESCRIPTION OF THE INVENTION

The present invention is a system and method for identifying a work from media content presented over a media playing device, such as a computer. The system generates a media sample or analytical representation from the media content of the work, such as audio and/or video, played on the media player. The media sample or representation is compared to a database of samples of media content or representations of known works to query and ascertain content-related information related to the work. This media content-related information of the work is then displayed on the media player.

The invention further relates to machine readable media which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

By way of example only, and not of limitation, the media player may comprise any data processing means or computer executing the present invention including devices carrying out the invention via an embedded system. For example, the media player may comprise cellular or mobile phones, portable media players, and fixed media players including analog broadcast receivers (such as car stereo, home stereos, and televisions, for example).

In a first embodiment, the database of media content samples of known works resides on a "lookup server" which carries out the database query described above. In general, the lookup server is operatively coupled for communication to one or more media players (client) via the Internet as is known in the art. Under this arrangement, media samples of works are first communicated from the client to the lookup server before the media samples are compared to the database. Then after the database query is carried out on the lookup server, the content-related information of the work is transmitted to the client for presentation thereon.

According to this embodiment, the system of the present invention generally includes one or more client media players, each operatively coupled for communication to a lookup server. As noted above, the lookup server is generally connected to the client media players via an Internet connection, although any suitable network (including wired or wireless) connection may also be used.

For example, the client media player may comprise a computer. The client computer typically plays audio files via a sound card and speakers. Video files are played via a video card and a monitor. The client computer has executing thereon a "client engine" software application comprising a sampling unit, a media intercept unit (intercept unit), and a user-interface.

By way of example, and not of limitation, the intercept unit carries out the operation of monitoring the client computer for media content of a work presented thereon. In general, the intercept unit carries out the operation of monitoring audio signals transmitted to the sound card and/or video signals transmitted to the video card. The intercept unit may also monitor the operations of other hardware suitable for communicating audio and/or video signals, such as USB (universal serial bus) and IEEE (Institute of Electrical and Electronics Engineers) standard 1394 connections, for example. Preferably, the intercept unit maintains a FIFO (first in first out) buffer of fixed size (150 seconds, for example) containing media content played on the client.

The sampling unit carries out the operation of creating a media sample from the media content of a work played on the client computer in order to represent and identify the work. In general, the sampling unit creates a sample of the work from the FIFO buffer maintained by the intercept unit. The sampling unit may create media samples from the media content of a work according to a predetermined or user-defined interval or upon the request of the user of the client computer. A user request may be received via commands issued using the user-interface. In general, the media sample created by the sampling unit comprises a "digital fingerprint" or "digital signature" using conventional digital signal processing known in the art. For example, a sound file may be sampled according to its acoustic/perceptual features over time. It is noted that "media sample" is defined herein to include actual recordings of the media content and/or analytical representations of the media content of the work. One example of such a digital signal processing technique for creating a media sample is described in U.S. Pat. No. 5,918,223 issued to Blum which is hereby incorporated by reference as if set forth in its entirety. Other examples of methods for creating media samples are given in PCT application number WO200444820 having inventors Jin S. Seo, Jaap A. Haitsma and Antonius A. C. M. Kalker and assigned to Koninklijke Philips Electronics and PCT application number WO03091990 having inventors Daniel Culbert and Avery Li-Chun Wang and assigned to Shazam Entertainment, Ltd. The media sample is then transmitted to the lookup server for further processing, as described in further detail below.

The user interface carries out the operation of receiving commands from a user of the client computer, and displaying content-related information to the user. As noted above, a user may issue a request for content-related information via the user-interface. This request is communicated to the sampling unit for further processing. As described above, in response to this request, the sampling unit creates a sample of the media content being played on the client computer and transmits the sample to the lookup server for further processing. In response, the lookup server provides the information related to the media sample to the client computer. This content-related information is received by the user interface which then displays the received information to the user of the client computer.

The content-related information for the work returned from the lookup server may also be used for a plurality of purposes including, for example, generating a log of the user activity, providing an option to purchase media to the user, and displaying the content-related information on the media playing device, among others.

The lookup server has executing thereon a "server engine" software application comprising a lookup unit, and a log unit. The lookup unit is further coupled to a media database, and the log unit is coupled to a log database. While the present invention describes the lookup server as a single machine, a group or cluster of server machines may be used to carry out the tasks of the lookup server described herein to thereby balance the load between several machines as is known in the art.

The lookup unit carries out the operation of receiving media samples of the work from client computers and performing database queries on the media database to ascertain content information related to the media sample provided. This content-related information of the work may include such information as song title, artist, and album name, for example. The content-related information of the work may also include product fulfillment information, such as how and where to purchase media containing the work, advertising banners, and/or promotional offers, for example. This content-related information of the work is transmitted back to the client computer for further processing thereon.

The log unit caries out the operation of tracking media requests made by the users of the client computers to the lookup server. The log unit maintains a plurality of information related to the requests made by the user including, for example, media type, genre or category. This user information is maintained in the log database.

The source of the media content of the work played on the client computer includes conventional media sources such as Internet sources or webcasts, including streaming media and archived media. The media content source may also be audio CDs, DVD, or other formats suitable for presentation on media playing devices, such as the client computer.

In a second embodiment of the present invention, the database of sampled media content resides within the client computer. The database resides on conventional storage medium, such as a computer memory, a hard drive, CD-ROM, or other appropriate storage medium. Under this arrangement, the database query is carried out "locally" on the computer playing the media content. It will be readily apparent to those skilled in the art that various other topological arrangements of the system elements (including the location of the database) may be used with the invention without departing from the scope and spirit of the invention.

An object of the invention is to provide an apparatus and method for identifying media content presented over a media playing device which overcomes the deficiencies of the prior art.

Another object of the invention is to provide an apparatus and method for identifying media content presented over a media playing device which does not require the media content provider to provide content-related information.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
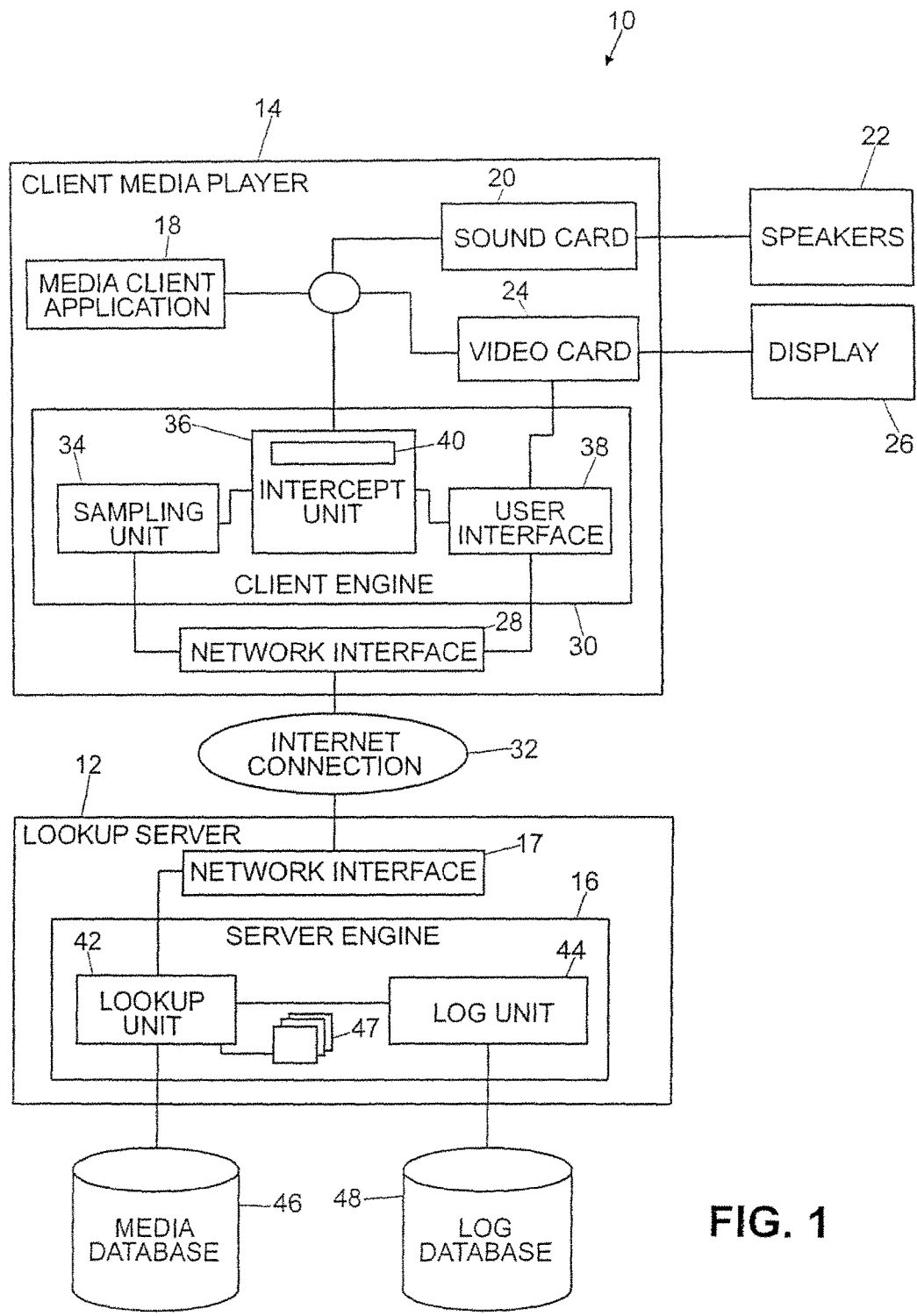
FIG. 1 is a functional block diagram of a media content identifying system in accordance with the invention.
Figure 2:
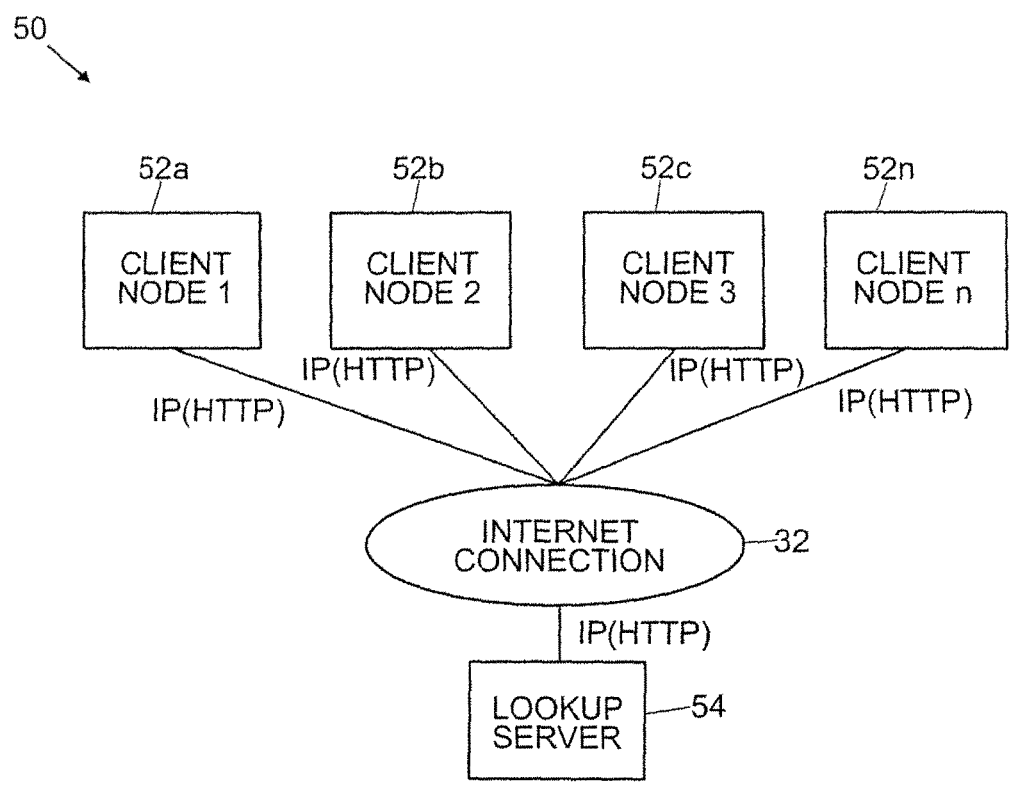
FIG. 2 is a functional block diagram of a media content identifying system having a plurality of client nodes in accordance with the invention.
Figure 3:
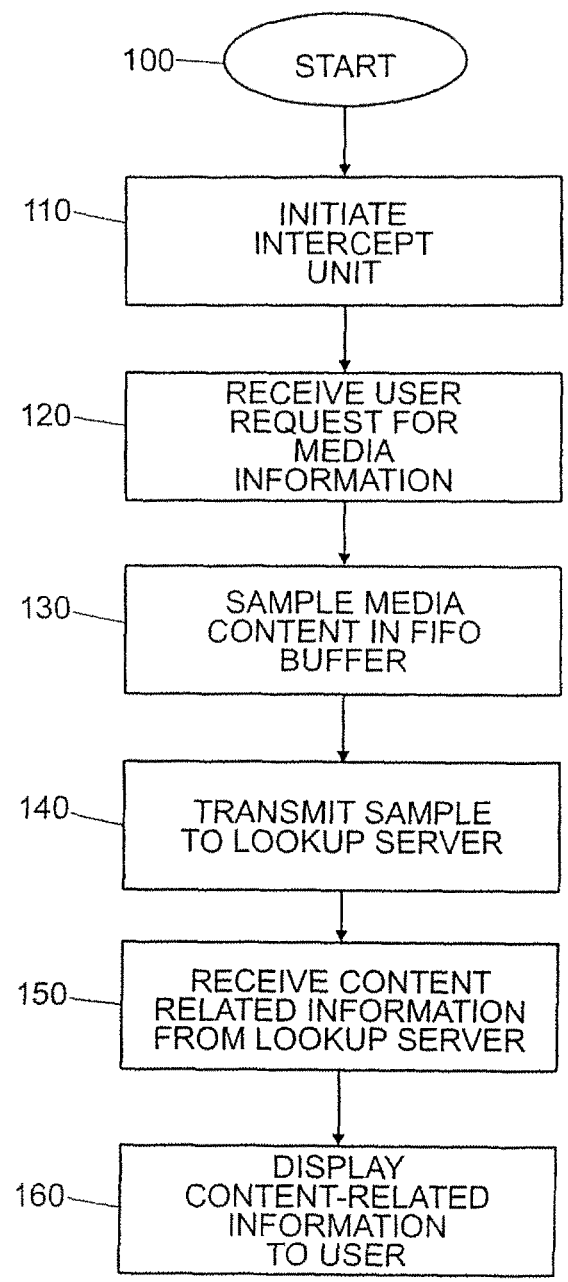
FIG. 3 is a flow chart showing generally the processes associated with the client engine in accordance with the invention.
Figure 4:
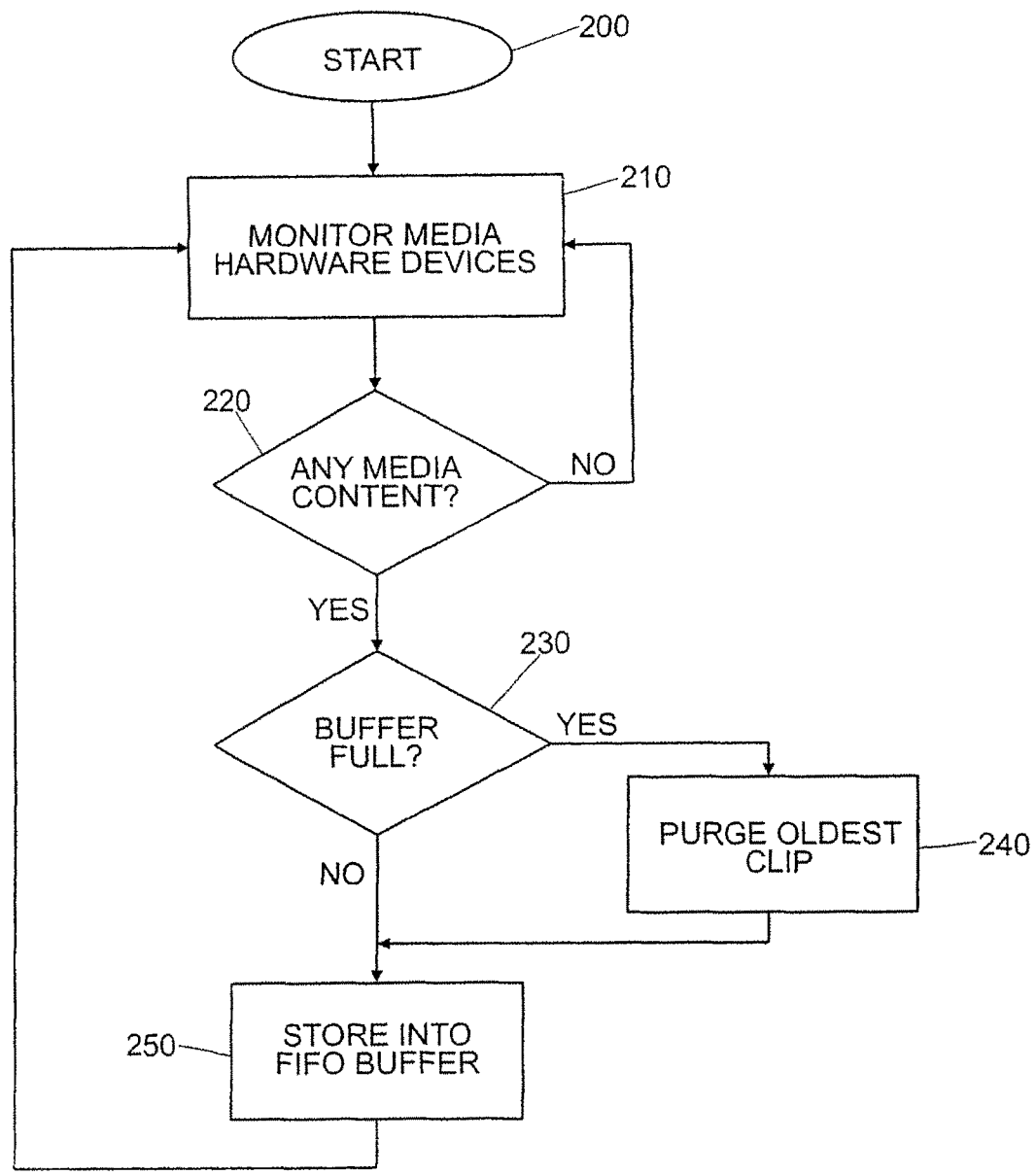
FIG. 4 is flow chart showing generally the processes associated with the media intercept unit in accordance with the invention.
Figure 5:
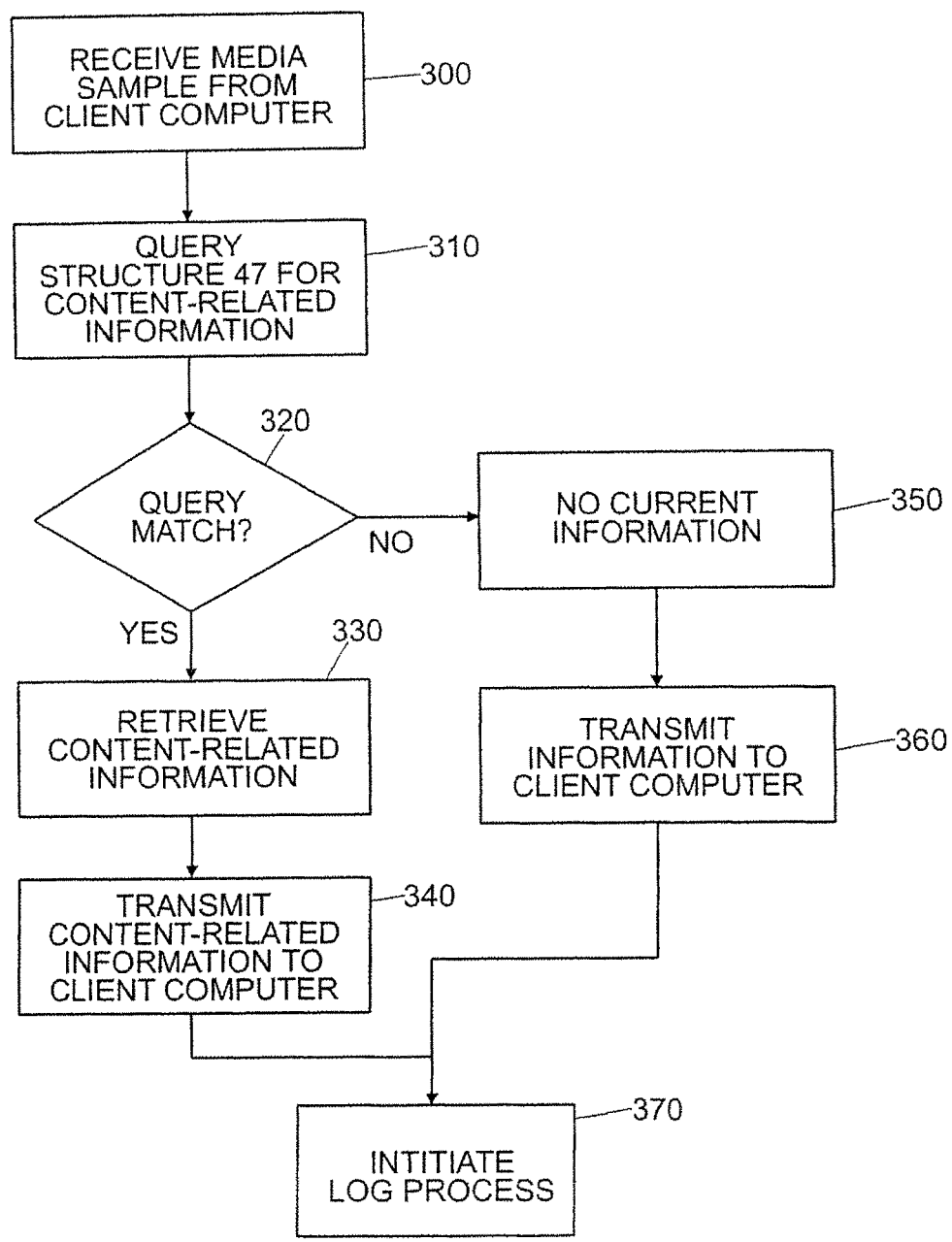
FIG. 5 is flow chart showing generally the processes associated with the server engine in accordance with the invention.

Referring more specifically to the drawings, for illustrative purposes the present invention is embodied in the apparatus shown FIG. 1 and FIG. 2 and the method outlined in FIG. 3 through FIG. 5. It will be appreciated that the apparatus may vary as to configuration and as to details of the parts, and that the method may vary as to details and the order of the acts, without departing from the basic concepts as disclosed herein. The invention is disclosed generally in terms of an apparatus and method for identification of a work on a personal computer, although numerous other uses for the invention will suggest themselves to persons of ordinary skill in the art.

Referring first to FIG. 1, there is generally shown a functional block diagram of a media content identifying system 10 in accordance with the invention. The system 10 comprises a lookup server 12 and at least one client media player 14. The lookup server 12 can be any standard data processing means or computer, including a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer. Lookup server 12 generally includes conventional computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, and/or other conventional input/output devices. Lookup server 12 also includes a Network Interface 17 for communication with other computers using an appropriate network protocol.

Lookup server 12 has loaded in its RAM a conventional server operating system (not shown) such as UNIX®, WINDOWS® NT, NOVELL®, SOLARIS®, or other server operating system. Lookup server 12 also has loaded in its RAM server engine software 16, which is discussed in more detail below.

Client media player 14, may comprise a standard computer such as a minicomputer, a microcomputer, a UNIX® machine, mainframe machine, personal computer (PC) such as INTEL®, APPLE®, or SUN® based processing computer or clone thereof, or other appropriate computer. As such, client media player 14 is normally embodied in a conventional desktop or "tower" machine, but can alternatively be embodied in a portable or "laptop" computer, a handheld personal digital assistant (PDA), a cellular phone capable of playing media content, a dumb terminal playing media content, a specialized device such as Tivo® player, or an internet terminal playing media content such as WEBTV®, among others. As described above, client media player 14 may also comprise other media playing devices such as a portable stereo system, fixed stereo systems, and televisions suitable for use with embedded systems carrying out the operations of the client engine as described further below.

Client media player 14 also includes typical computer components (not shown), such as a motherboard, central processing unit (CPU), random access memory (RAM), hard disk drive, other storage media such as diskette drive, CD-ROM, flash-ROM, tape drive, PCMCIA cards and/or other removable media, keyboard, mouse and/or other user interface means, a modem, and/or other conventional input/ output devices.

Client media player 14 also has loaded in RAM an operating system (not shown) such as UNIX®, WINDOWS® XP or the like. Client media player 14 further has loaded in RAM a media client application program 18 such as Real Player™, Windows™ Media Player, Apple Quicktime™ Player, or other appropriate media client application for playing audio and/or video via client media player 14. Client media player 14 also has loaded in its RAM client engine software 30, which is discussed in more detail below.

Client media player 14 further includes a conventional sound card 20 connected to speakers 22. As is known in the art, the media client application 18 will generally play audio signals through the sound card device 20 and speakers 22. For example, audio streams, audio files, audio CDs, and other audio sources are communicated from the client application 18 to the sound card 20 for output. The sound card 18 then produces the audio signal via speakers 22.

Client media player 14 also includes a conventional video card 24 connected to a display means 26. As is known in the art, the media client 18 will generally play video content through the video card 24, which then produces an appropriate video signal suitable for display on the display means 26. The display means 26 may be a standard monitor, LCD, or other appropriate display apparatus. Client media player 14 also includes a Network Interface 28 for communication with other computers using an appropriate network protocol. The network interface 28 may comprise a network interface card (NIC), a modem, ISDN (Integrated Services Digital Network) adapter, ADSL (Asynchronous digital subscriber line) adapter or other suitable network interface.

Client media player 14 is networked for communication with lookup server 12. Typically, client media player 14 is operatively coupled to communicate with lookup server 12 via an Internet connection 32 through a phone connection using a modem and telephone line (not shown), in a standard fashion. The user of client media player 14 will typically dial the user's Internet service provider (ISP) (not shown) through the modem and phone line to establish a connection between the client media player 14 and the ISP, thereby establishing a connection between the client media player 14 and the Internet 32. Generally, lookup server 12 is also connected to the Internet 32 via a second ISP (not shown), typically by using a fast data connection such as T1, T3, multiple T1, multiple T3, or other conventional data connection means (not shown). Since computers connected to the Internet are themselves connected to each other, the Internet 32 establishes a network communication between client media player 14 and server 12. One skilled in the art will recognize that a client may be connected to any type of network including but not limited to a wireless network or a cellular network. Generally, client media player 14 and lookup server 12 communicate using the IP (internet protocol). However, other protocols for communication may also be utilized, including PPTP, NetBEUI over TCP/IP, and other appropriate network protocols.

Client media player 14 and server 12 can alternatively connect to the Internet 32 using a network means, wireless means, satellite means, cable means, infrared means or other means for establishing a connection to the Internet, as alternatives to telephone line connection. Alternative means for networking client media player 14 and server 12 may also be utilized, such as a direct point to point connection using modems, a local area network (LAN), a wide area network (WAN), wireless connection, satellite connection, direct port to port connection utilizing infrared, serial, parallel, USB, FireWire/IEEE-1394, ISDN, DSL and other means known in the art.

In general, client engine 30 is a software application executing within the client media player 14. However, client engine 30 may also be an embedded system carrying out the functions described herein and suitable for use with various media player platforms. Client engine 30 comprises a sampling unit 34, an intercept unit 36, and a user interface 38.

The intercept unit 36 carries out the operation of monitoring the client media player 14 for media content of a work presented thereon, typically by media client application 18, but may be from any media source. In operation, the intercept unit 36 monitors audio signals transmitted from the media client 18 to the sound card 20 and/or video signals transmitted from the media client 18 to the video card 24. The intercept unit 36 may also monitor the operations of other hardware (not shown) suitable for communicating audio and/or video signals, such as USB, IEEE standard 1394 connections, and analog input devices (such as microphones). For example, in a media player comprising a mobile stereo system, the intercept unit 36 intercepts the audio signal played on thereon.

Preferably, the intercept unit 36 maintains a FIFO (first in first out) buffer 40 of fixed size (150 seconds, for example) for storing media content of a work played on the client media player 14, and from which media samples of the work are created by sampling unit 34. The operation of the intercept unit is further described below in conjunction with FIG. 4.

The sampling unit 34 carries out the operation of creating a media sample from the media content of a work played on the client media player 14. In operation, the sampling unit 34 creates a media sample from the FIFO buffer 40 maintained by the intercept unit 36. The sampling unit 34 may create media samples according to a predetermined or user-defined interval or upon the request of user of the client media player 14. For example, user requests may be received via commands issued using the user-interface 38.

As noted above, the media sample created by the sampling unit 34 typically comprises a "digital fingerprint" using conventional digital signal processing known in the art. For example, a sound file may be sampled according to its acoustic/perceptual features over time. One example of such a digital signal processing technique is described in U.S. Pat. No. 5,918,223 issued to Blum which is hereby incorporated by reference as if set forth in its entirety. Other examples are described in PCT application number WO200444820 having inventors Jin S. Seo, Jaap A. Haitsma and Antonius A. C. M. Kalker and assigned to Koninklijke Philips Electronics and PCT application number WO03091990 having inventors Daniel Culbert and Avery Li-Chun Wang and assigned to Shazam Entertainment, Ltd. The media sample generated by sampling unit 34 is then transmitted to the lookup server 12 for further processing, as described in further detail below.

The user interface 38 carries out the operation of receiving commands from a user of the client media player 14, and displaying content-related information to the user. The user interface 38 may be any conventional interfaces including, for example, a graphical user interface (GUI), a command line user interface (CLUI), a voice recognition interface, a touch screen interface, a momentary contact switch on a stereo system, or other appropriate user interface.

In operation, a user may issue a request for content-related information via the user-interface 38. This request is communicated to the sampling unit 34 for further processing. As described above, in response to such a request, the sampling unit 34 creates a media sample from the media content of a work being played on the client media player 14 and transmits the sample to the lookup server 12 for further processing. In response, the lookup server 12 provides the information related to the work, if available, to the client media player. This content-related information of the work is received by the user interface 38 which then displays the received information to the user of the client media player 14.

The server engine 16 is a software application executing within the lookup server 12. Server engine 16 comprises a lookup unit 42 and a log unit 44. Lookup unit 42 is operatively coupled for communication with a media database 46. Log unit 44 is operatively coupled for communication with a log database 48.

The lookup unit 42 carries out the operation of receiving media samples from the client media player 14 and comparing the media samples to a collection of samples of the media content of known works (reference samples). The collection of reference samples of known works will typically reside in an in-memory structure (designated 47). Upon initialization of the lookup unit 42, the collection of reference samples of known works from the media database 46 is stored in the in-memory structure 47.

The lookup unit 42 sequentially compares each reference sample of known works in structure 47 to the media sample provided by the media player 14. The lookup unit will cut a media sample of the received work into a series of overlapping frames, each frame the exact size of the particular reference sample under examination. The lookup unit 42 will then compare the reference sample to every possible "frame" of information within the media samples of the known works and compute a "distance" between each frame and the reference sample. This process repeats for each reference sample. The reference sample which has the smallest distance to any frame in the sample is considered for a match. If this distance is below a predefined threshold, a match is considered to be found.

When a match is determined, the information related to the matching record of the known work is returned to the client media player for presentation thereon. This content-related information of a work may include such information as song title, artist, and album name, for example. The content-related information may also include product fulfillment information, such as how and where to purchase media containing the media sample, advertising banners, and/or promotional offers, for example. This content-related information of the work is transmitted back to the client media player 14 for further processing thereon.

The log unit 44 caries out the operation of tracking media requests made by the users of the client media player 14 to the lookup server 12. The log unit 44 maintains a plurality of information related to the requests made by the user including, for example, media type, genre or category. This user information is maintained in the log database 48

Media database 46 and log database 48 comprise conventional relational database storage facilities. Thus, media database 46 may comprise one or more tables (not shown) for storing data associated with the media content samples of known works and related content-specific information (song name, title, album name, etc.) of the known works. In general, another computer (not shown) may be connected to the lookup server 12 for entering the content-specific media information into the media database 46. Log database 46 may comprise one or more tables (not shown) for storing data associated with users and the user's related media content requests.

Referring now to FIG. 2, there is generally shown a functional block diagram of a media content identifying system 50 having a plurality of client nodes in accordance with the invention.

System 50 comprises a lookup server 54 operatively coupled for communication with a plurality of client media players 52*a* through 52*n* via Internet connection 32. System 50 operates in substantially the same manner as system 10 described above. That is, lookup server 54 operates in the same manner as lookup server 12, and clients 52*a* through 52*n* operate in the same manner as client media player 14. However, in system 50, lookup server 12 handles a plurality of media sample identification requests from the client 52*a* through 52*n*.

As depicted in. FIG. 2, clients 52*a* through 52*n* communicate with lookup server 54 using the HTTP (hypertext transfer protocol) over IP. Although http is used in the example, one skilled in the art will recognize that any suitable protocol may be used. More particularly, the media sample signal generated by each client 52*a* through 52*n* is wrapped using a transport protocol before being transmitted over HTTP to lookup server 54 for processing. When lookup server 54 receives the HTTP transmission from the client media player, a transport protocol converts ("unwraps") the signal for processing therein by the server engine. Likewise, before transmitting content-related information retrieved from the media database to the appropriate client media player, the information is first wrapped using the transport protocol. The content-related information may be communicated using "XML" tags, or other appropriate programming, scripting, or markup language. The appropriate client media player upon receiving the transmission from the lookup server 54 unwraps the signal for processing therein by the client engine.

The method and operation of the invention will be more fully understood by reference to the flow charts of FIG. 3 through FIG. 5. The order of acts as shown in FIG. 3 through FIG. 5 and described below are only exemplary, and should not be considered limiting.

Referring now to FIG. 3, as well as FIG. 1 and FIG. 2, there is shown the processes associated with the client engine 30 in accordance with the invention. As described above, the client engine 30 is a software application or embedded system operating within a client media player for identifying media content played via the client media player.

At process 100, the client engine 30 is initiated. The client engine 30 may be initiated by the user of client media player 14 or may initiate automatically upon the recognition of media content being played via the sound card 20 and/or the video card 24. Box 110 is then carried out.

At box 110, the intercept unit 36 is initiated. As described above, the intercept unit 36 carries out the operation of monitoring media content of a work played on client media player 14 (typically via sound card 20 and/or video card 24). The processes of the intercept unit 36 are described more fully below in conjunction with FIG. 4. After the intercept unit 36 is initiated, box 120 is then carried out.

At box 120, a user request for media information is received via user interface 38. This request is communicated from the user interface 38 to the sampling unit 34 for further processing. Box 130 is then carried out.

At box 130, the sampling unit 34 creates a media sample from the media data of a work contained in the FIFO buffer 40. The media sample created by the sampling unit 34 comprises a "digital fingerprint" using conventional digital signal processing known in the art. As noted above, a sound file may be sampled according to its acoustic/perceptual features over time. Box 14 is then carried out.

At box 140, the sampling unit 34 transmits the media sample created from box 130 to the lookup server 12 for content identification and content-related information. In the illustrative system depicted in FIG. 1 and FIG. 2, the media sample is first wrapped in a transport protocol and then communicated over IP (HTTP) via network interface 28. Box 150 is then carried out.

At box 150, the client media player 14 receives from the lookup server 12 the content-related information of the work requested in box 140. The process for generating the content-related information by the lookup server 12 is described in further detail below in conjunction with FIG. 5. This content data is first received via the network interface 28, unwrapped using the appropriate transport protocol and then communicated to the client engine 30. In the client engine 30, the user interface 38 receives the content-related information, and parses the data according to the appropriate format (XML tags, for example) transmitted by the lookup server 12. Box 160 is then carried out.

At box 160, the user interface 38 presents the content-related information of the work to the user via video card 24 and display 26, or other display device such as an LCD screen, or standard broadcast television. As described above, this content-related information of the work may include such information as song title, artist, and album name, for example. The content-related information of the work may also include product fulfillment information, such as how and where to purchase media containing the media sample, advertising banners, and/or promotional offers, for example.

Referring now to FIG. 4, there is generally shown the processes associated with the media intercept unit 36 in accordance with the invention. In general, the media intercept unit 36 maintains a FIFO buffer of predetermined size (150 seconds, for example) of media content played via client media player 14, 52a through 52n.

At process 200, the intercept unit 36 is initiated. This is carried out from box 110 of FIG. 3, during the start up of the client engine software 30. Box 210 is then carried out.

At box 210, the intercept unit 36 monitors the media hardware devices of the client media player 14. As described above, the media hardware devices may comprise a sound card 20 and/or a video card 24. Other hardware devices suitable for playing media content are also monitored by the intercept unit 36. Diamond 220 is then carried out.

At diamond 220, the intercept unit 36 determines whether any media hardware devices are playing media content of a work. If the intercept unit 36 determines that media content is currently being played, diamond 230 is carried out. Otherwise box 210 is repeated.

At diamond 230, the intercept unit 36 determines whether the FIFO buffer 40 is currently full. If the buffer is determined to be full, box 240 is carried out. Otherwise, box 250 is carried out.

At box 240, the intercept unit 36 has determined that all the buffer 40 is full and deletes the older sample in the buffer. As noted above, the FIFO buffer 40 is commonly configured with a predetermined size. For example, if the sampling rate is 22 KHz (HiloHertz), the oldest $1/22000^{th}$ of a second sample would be deleted, and the newest $1/22,000^{th}$ of a second sample would be added to the buffer. Using this method, the intercept unit 36 is able to maintain the most recent one hundred fifty (150) seconds of media content of a work played via client media player 14. Box 250 is then carried out.

At box 250, the intercept unit 36 stores the media content of the work currently being played on client media player 14 into the FIFO buffer 40. Box 210 is then repeated to continue monitoring media hardware devices.

Referring now to FIG. 5, there is generally shown the processes associated with the server engine 16 and the lookup server 12 in accordance with the invention. It is noted that the lookup server 12 is structured and configured to handle a plurality of requests from a plurality of client media players as depicted in FIG. 2 above.

Prior to box 300 as described below, the in-memory structure 47 is populated with reference media samples of known works. Upon initialization of the lookup unit 42, the collection of reference samples from the media database 46 is stored in the in-memory structure 47.

At box 300, the lookup server 12 receives a media sample request from one of the client media players 14, 52a through 52n. As described above, such requests are generally communicated over an Internet connection 32, although any suitable network connection may also be used. The request is first received via network interface 17 via the IP (HTTP) protocol or other suitable protocol. An appropriate transport protocol unwraps the message and communicates the request to the server engine 16 for processing. Box 310 is then carried out.

At box 310, the lookup unit 42 sequentially compares each reference sample of the known works in structure 47 to the media sample of the work provided by the media player 14, 52a through 52n, as described above. The lookup unit will cut the media sample into a series of overlapping frames, each frame the exact size of the particular reference sample under examination. The lookup unit 42 will then compare the reference sample to every possible "frame" of information within the media sample and compute a "distance" between each frame and the reference sample. This process repeats for each reference sample. Diamond 320 is then carried out.

At diamond 320, the lookup unit 42 determines whether a match was obtained. As noted above, the reference sample of the known work which has the smallest distance to any frame in the sample is considered for a match. If the distance is below a predefined threshold, a match is considered to be found. If a match is determined, box 330 is then carried out. Otherwise box 350 is carried out.

At box 330, the media sample from box 300 matches a corresponding record in the media database 46, and the lookup unit 42 retrieves the content-related information of the known work associated with the matching record in the media database 46. As noted above, this content-related information may include such information as song title, artist, album name, for example as well as other information such as product fulfillment information such as a sponsor or an advertiser. Box 340 is then carried out.

At box 340, the content-related information of the known work obtained in box 330 is transmitted to the client media player submitting the media sample request in box 300. In the preferred embodiment, this transmission is carried out over the Internet using the IP (HTTP) protocol or other suitable protocol. Box 370 is then carried out to generate a log.

At box 350, the lookup unit 42 has determined that the media sample of the work from box 300 does not match any reference sample in the in-memory structure 47. Box 360 is then carried out.

At box 360, a notice indicating that the requested information is not available is transmitted to the requesting client media player of box 300. Box 370 is then carried out.

At box 370 the log process is initiated. This log process involves tracking the user and related-media information associated with the request of box 300. The log unit 44 maintains a plurality of information related to the requests made by the user including, for example, media type, genre or category. This user information is maintained in the log database 48 and may be used for various marketing strategies, including analyzing user behavior, for example.

Accordingly, it will be seen that this invention provides an apparatus and method which provides real-time media content-related information to users viewing media content over a personal computer, or other data processing means. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method comprising:
   receiving, by a media player, streamed or broadcast audio or video media content of a work, wherein the media player comprises an analog broadcast receiver, and wherein at least a portion of the audio or video media content of the work is received via the analog broadcast receiver;
   playing, by the media player, the streamed or broadcast audio or video media content of the work;
   determining, by an intercept unit of an embedded system of the media player, that the audio or video media content of the work is currently being played on the media player;
   intercepting, by the intercept unit, audio media signals corresponding to the currently playing audio or video media content of the work;
   writing, by the intercept unit, the audio media signals to a first in first out (FIFO) buffer;
   receiving, via a user interface of the media player, a user request for information related to the work currently being played by the media player;
   responsive to receiving the user request, generating, by a sampling unit of the embedded system of the media player and using the audio media signals, a media sample based on a segment of the media content that is less than an entirety of the work, the media sample comprising a digital fingerprint of the segment of the media content that is based on acoustical features of the segment;
   sending, by the media player, a query to a lookup server for data associated with the work, the query comprising the media sample;
   receiving, by the media player, the data associated with said work in response to said query, the data having been identified by the lookup server based on separate comparisons of a plurality of portions of the media sample to a collection of reference samples of known works, each of the plurality of portions of the media sample having a size that is smaller than the media sample; and
   displaying the data via the user interface while the work is being played.

2. The method of claim 1, further comprising:
   buffering the segment of the media content by the media player while the segment is played on the media player.

3. The method of claim 1, further comprising:
   generating a log of user activity based on the received data; and
   offering for purchase, by the media player, at least one of a product or a service related to said work based on said log.

4. The method of claim 1, wherein said media player is at least one of a portable media player or a mobile phone.

5. The method of claim 1, wherein said work includes at least one of a song, a musical audio track or a nonmusical audio track.

6. A non-transitory machine-readable medium including instructions that, when executed by a media player, cause the media player to:
   receive, by the media player, streamed or broadcast audio or video media content of a work, wherein the media player comprises an analog broadcast receiver, and wherein at least a portion of the audio or video media content of the work is received via the analog broadcast receiver;
   play, by the media player, the streamed or broadcast audio or video media content of the work;
   determine, by an intercept unit of an embedded system of the media player, that the audio or video media content of the work is currently being played on the media player;
   intercept, by the intercept unit, audio media signals corresponding to the currently playing audio or video media content of the work;
   write, by the intercept unit, the audio media signals to a first in first out (FIFO) buffer;
   receive, via a user interface of the media player, a user request for information related to the work currently being played on the media player;
   responsive to receiving the user request, generate, by a sampling unit of the embedded system of the media player and using the audio media signals, a media sample based on a segment of the media content that is less than an entirety of the work, the media sample comprising a digital fingerprint of the segment of the media content that is based on acoustical features of the segment;
   send a query to a lookup server for data associated with the work, the query comprising the media sample;
   receive the data associated with said work from said lookup server in response to said query, the data having been identified by the lookup server based on separate comparisons of a plurality of portions of the media sample to a collection of reference samples of known works, each of the plurality of portions of the media sample having a size that is smaller than the media sample; and
   display the data via the user interface while the work is being played.

7. The non-transitory machine-readable medium of claim 6, the at least one processing unit further to:
  generate a log of user activity based on the received data; and
  offer for purchase at least one of a product or a service related to said work based on said log.

8. The non-transitory machine-readable medium of claim 6, wherein said work includes at least one of a song, a musical audio track or a nonmusical audio track.

9. A media player comprising:
  a receiver to receive streamed or broadcast audio media content of a work, wherein the receiver comprises an analog broadcast receiver, wherein at least a portion of the audio media content of the work is received via the analog broadcast receiver, and wherein the media player is to play the streamed or broadcast audio media content of the work on a speaker;
  a speaker;
  a display;
  a user interface;
  a first in first out (FIFO) buffer; and
  an embedded system comprising an intercept unit and a sampling unit;
    wherein the intercept unit of the embedded system is to:
      determine that the audio media content of the work is being played;
      intercept audio media signals corresponding to the audio media content of the work;
      and write the audio media signals to the FIFO buffer;
    wherein responsive to the media player receiving, via the user interface, a user request for information related to the work played by the media player, the sampling unit is to use the audio media signals to generate a media sample based on a segment of the media content that is less than an entirety of the work, the media sample comprising a digital fingerprint of the segment of the media content that is based on acoustical features of the segment; and
    wherein the media player is further to:
      send a query to a lookup server for data associated with the work, the query including said digital fingerprint;
      receive the data associated with said work from said lookup server in response to said query, the data having been identified by the lookup server based on separate comparisons of distinct portions of the digital fingerprint to a collection of digital fingerprints of known works; and
      output, via the user interface, the data on the display while the work is played.

10. The media player of claim 9, the at least one processing unit further to:
  generate a log of user activity based on the received data; and
  offer for purchase at least one of a product or a service related to said work based on said log.

11. The media player of claim 9, wherein said media player is at least one of a portable media player or a mobile phone.

12. The media player of claim 9, wherein said work includes at least one of a song, a musical audio track or a nonmusical audio track.

13. The method of claim 1, wherein the media player is selected from a group consisting of a car stereo, a home stereo, and a television.

14. The non-transitory machine-readable medium of claim 6, wherein the media player is selected from a group consisting of a car stereo, a home stereo, and a television.

15. The media player of claim 9, wherein the media player is selected from a group consisting of a car stereo, a home stereo, and a television.

* * * * *